United States Patent
Qin et al.

(10) Patent No.: US 11,068,481 B2
(45) Date of Patent: *Jul. 20, 2021

(54) OPTIMIZED FULL-SPECTRUM ORDER STATISTICS-BASED CARDINALITY ESTIMATION

(71) Applicant: OATH (AMERICAS) INC., Dulles, VA (US)

(72) Inventors: Jason Jinshui Qin, Great Falls, VA (US); Denys Kim, Fairfax, VA (US); Yumei Tung, Vienna, VA (US)

(73) Assignee: Verizon Media Inc., New York, NY (US)

( * ) Notice: Subject to any disclaimer, the term of this patent is extended or adjusted under 35 U.S.C. 154(b) by 1276 days.

This patent is subject to a terminal disclaimer.

(21) Appl. No.: 15/131,968

(22) Filed: Apr. 18, 2016

(65) Prior Publication Data
US 2017/0300529 A1 Oct. 19, 2017

(51) Int. Cl.
*G06F 16/24* (2019.01)
*G06F 16/2453* (2019.01)
*G06F 16/22* (2019.01)

(52) U.S. Cl.
CPC ...... *G06F 16/2453* (2019.01); *G06F 16/2255* (2019.01)

(58) Field of Classification Search
CPC .................. G06F 16/2453; G06F 16/2255
See application file for complete search history.

(56) References Cited

U.S. PATENT DOCUMENTS

| | | | |
|---|---|---|---|
| 7,412,449 B2* | 8/2008 | Both | G06F 16/137 |
| 9,270,592 B1* | 2/2016 | Sites | H04L 45/745 |
| 2009/0192980 A1* | 7/2009 | Beyer | G06F 16/2462 |
| 2009/0216709 A1* | 8/2009 | Cheng | G06F 16/2453 |

(Continued)

OTHER PUBLICATIONS

P. Flajolet, É. Fusy, O. Gandouet, and F. Meunier. "Hyperloglog: The analysis of a near-optimal cardinality estimation algorithm," in Analysis of Algorithms (AOFA), pp. 127-146, 2007.

(Continued)

*Primary Examiner* — Alicia M Willoughby
(74) *Attorney, Agent, or Firm* — Cooper Legal Group, LLC

(57) ABSTRACT

Systems and methods are disclosed for optimizing full-spectrum cardinality approximations on big data utilizing an optimized order statistics technique. To accomplish the foregoing, a multiset of objects that each corresponds to one of a plurality of objects associated with a resource are obtained. A compound data object is populated at least in part with data that is derived based on generated decimal fraction hash values that correspond to each object in the obtained multiset. The populated compound data object is processed with a full-spectrum arithmetic mean estimation operation that can accurately determine a cardinality estimate for the obtained multiset using less resources and time when compared to traditional techniques. The determination is further made without the need to employ linear counting or bias correction operations on low or high cardinalities. An estimated number of unique objects in the obtained multiset is determined as a result of the processing, and subsequently provided for display or further manipulation.

20 Claims, 11 Drawing Sheets

(56) References Cited

U.S. PATENT DOCUMENTS

| | | | | |
|---|---|---|---|---|
| 2011/0125771 | A1* | 5/2011 | Gladwin | G06F 21/602 |
| | | | | 707/758 |
| 2012/0166478 | A1* | 6/2012 | Das | G06F 16/2453 |
| | | | | 707/769 |
| 2015/0269178 | A1* | 9/2015 | Rhodes | G06F 16/958 |
| | | | | 707/700 |
| 2015/0286676 | A1* | 10/2015 | Dickie | G06F 16/244 |
| | | | | 707/737 |
| 2016/0140208 | A1* | 5/2016 | Dang | G06F 17/18 |
| | | | | 707/737 |
| 2017/0286006 | A1* | 10/2017 | Jain | G06F 12/0292 |
| 2018/0107696 | A1* | 4/2018 | Moscibroda | G06F 17/18 |

OTHER PUBLICATIONS

M. Durand and P. Flajolet, "LogLog counting of large cardinalities," in Annual European Symposium on Algorithms (ESA03) (2003), G. Di Battista and U. Zwick, Eds., vol. 2832 of Lecture Notes in Computer Science, pp. 605-617.

S. Heule, M. Nunkesser, and A Hall. "HyperLogLog in Practice: Algorithmic Engineering of a State of the Art Cardinality Estimation Algorithm," 2013, Google, Inc., pp. 1-10.

* cited by examiner

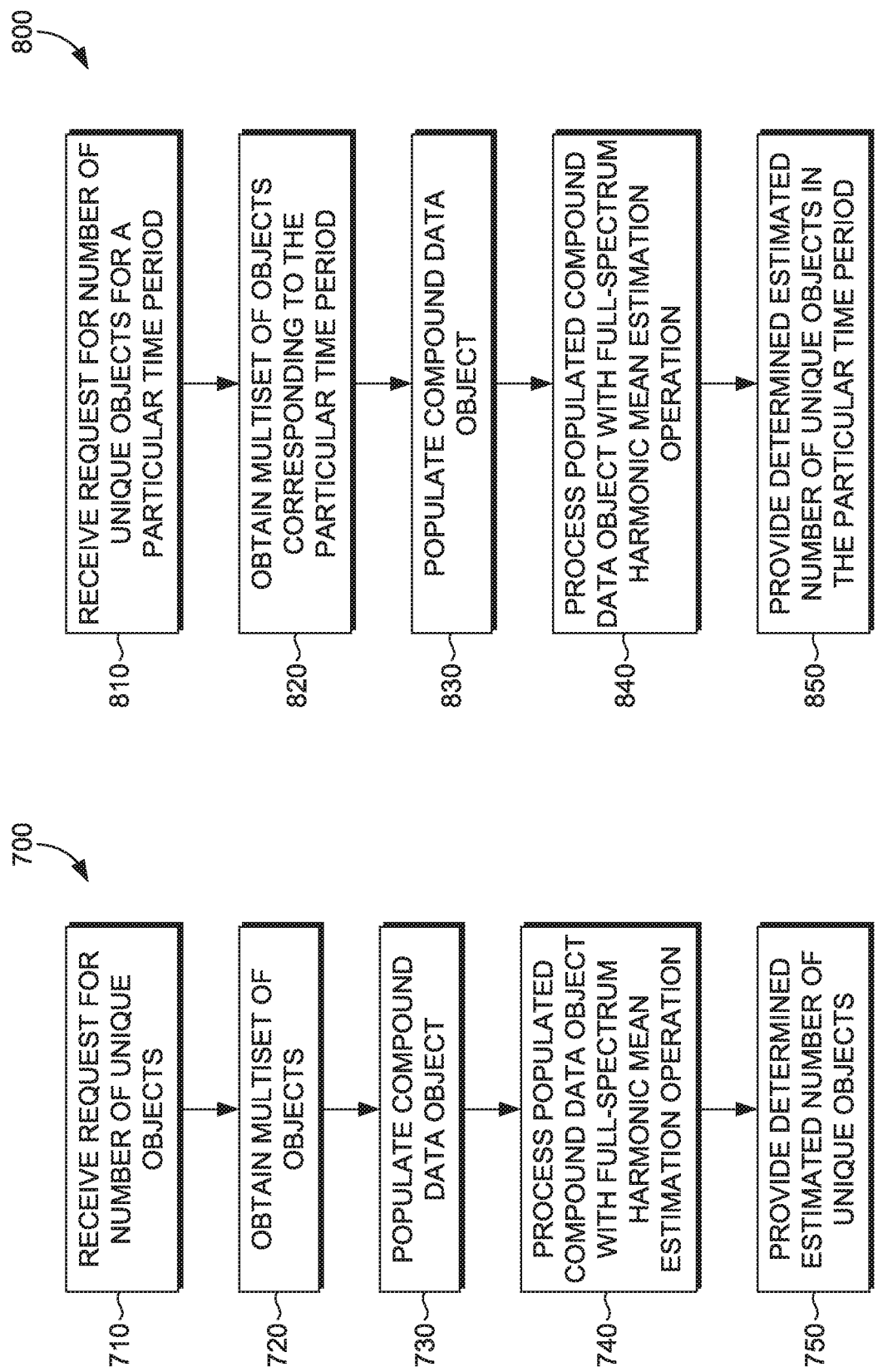

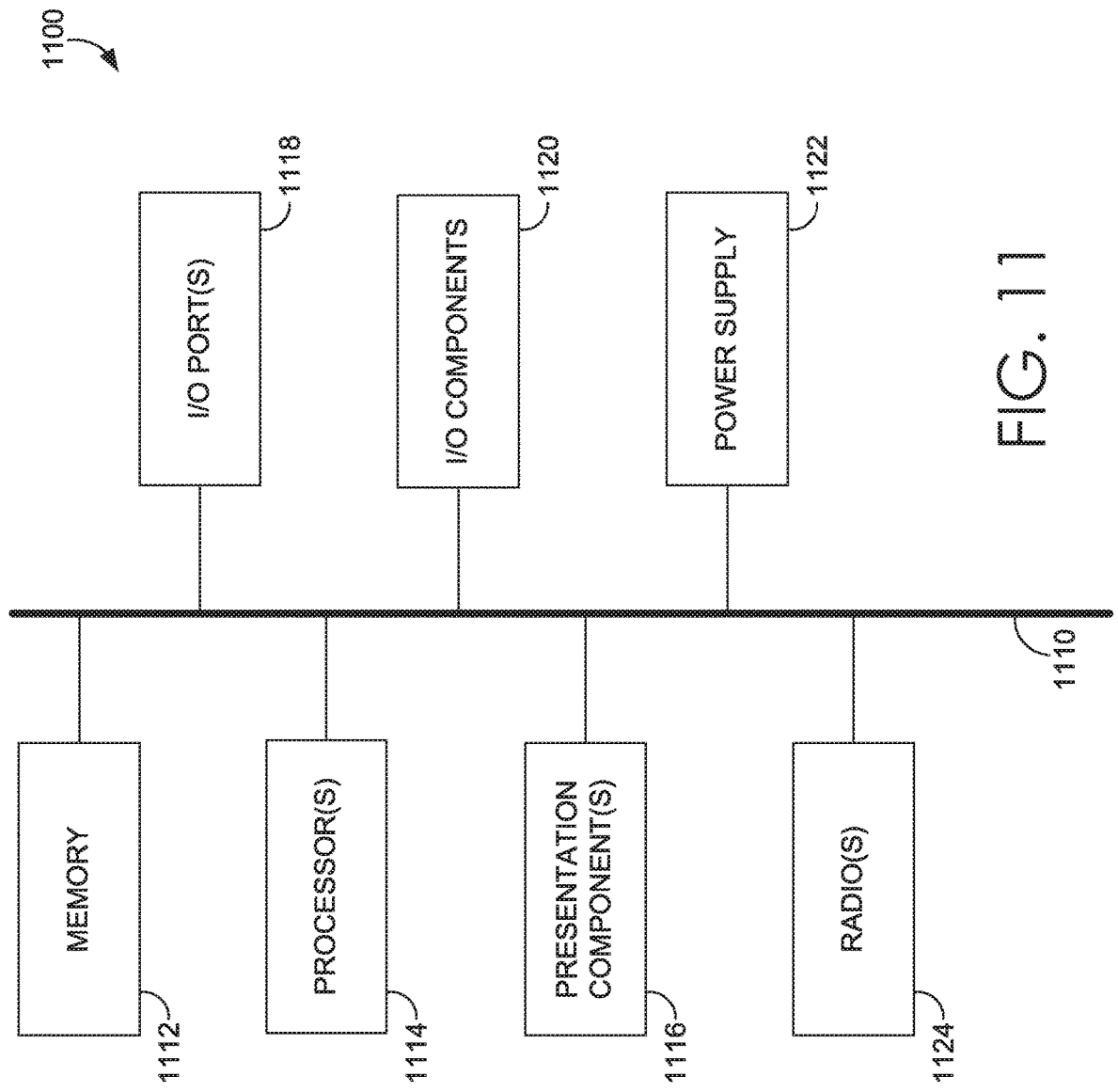

US 11,068,481 B2

OPTIMIZED FULL-SPECTRUM ORDER STATISTICS-BASED CARDINALITY ESTIMATION

CROSS-REFERENCE TO RELATED APPLICATIONS

This application, U.S. application Ser. No. 15/131,968, entitled "Optimized Full-Spectrum Order Statistics-Based Cardinality Estimation," is related by subject matter to concurrently filed U.S. application Ser. No. 15/131,904, entitled "Optimized Full-Spectrum LogLog-Based Cardinality Estimation." The entirety of the aforementioned application is incorporated by reference herein.

BACKGROUND

Data, particularly the collection and interpretation thereof, is becoming one of the primary goals of the technology sector. At any given time, enormous collections of data are obtained and stored by various entities, each having a common goal of leveraging the data to meet the requirements of their business. Leveraging data can be a daunting task, however, as large amounts of data (hereinafter referenced as "big data") can require a tremendous amount of computing resources and processing time. As a result, the cost for analyzing big data can be both financially and temporally expensive.

Some entities are particularly interested in identifying cardinalities in their big data collections. In other words, determining a number of unique elements in a particular dataset can be extremely valuable to some business models. For instance, determining how many unique visitors visiting a particular website, clicking a particular advertisement, or accessing a particular file in any given day can be useful in determining fee structures, overall value, popularity, and more. In some instances, identifying cardinality in big data can improve system security and performance by, for example, assisting in the detection of denial-of-service (DDoS) attacks or repeated failed login attempts. In the like of the foregoing examples, cardinality identification can be essential in many applications.

As was discussed, analyzing big data can be expensive. Identifying cardinality in big data unfortunately does not escape the limitations of technology. Traditional methods of identifying cardinality are based on the processing of data in a linear-time fashion, in other words, comparing the data elements one-by-one. Naturally, in a world that demands fast results, such methods are unacceptable. More recent methods and systems have been proposed to approximate cardinality, quite accurately for high-range cardinalities, while utilizing a significantly smaller amount of resources relative to the linear method. While such methods can determine generally accurate cardinality estimations within a limited range (e.g., low-range or mid-to-high range), they are still incapable of accurately approximating cardinalities across the full range of cardinalities. In attempts to compensate for this inaccuracy, the newer methods necessitate the execution of successive operations, thereby exposing the inaccuracy and inefficiency of such methods. In a world where minimal financial and temporal cost is increasingly demanded, a system or method for optimizing the determination of a cardinality estimation, requiring less computing processes, memory, and time, to accurately estimate cardinality for the entire range ("full-spectrum") of cardinalities would be highly beneficial.

SUMMARY

Embodiments described herein are directed to optimizing the process in determining cardinality estimates on big data. More specifically, fewer computing resources are utilized, improved processing times are achieved, and in most instances accuracy is improved, when determining a cardinality estimation on big data employing embodiments described herein. In particular, a request for a number of unique objects in a plurality of objects is received. An object can be a piece of data or information associated with a particular resource, such as a website. Any two of the objects can be different or share the same piece of data or information. A multiset of objects is obtained, where each object in the multiset corresponds to a different one of the plurality of objects associated with the resource. The multiset can include a portion or the entirety of objects associated with the resource, and in some instances, can be defined based on the request. A hash value is generated for each object in the obtained multiset of objects. A compound data object, allocated in a memory of a computing device, is populated at least in part with data that is based at least in part on the generated hash values. The compound data object is processed with a single function or operation that accurately and more-efficiently determines an estimated number of unique objects (i.e., the cardinality estimate) in the obtained multiset. The single procedure can automatically adjust the processing of the compound data object based at least in part on the estimated number of unique objects in the obtained multiset. This automatic adjustment can eliminate the need for subsequent processes typically required for a determination of smaller cardinalities, thereby decreasing overall computing cycles and processing times when compared to traditional methods. The determined estimated number of unique objects is then provided, either for display to a requesting user, or to a parent operation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 7-8 are flow diagrams showing methods for optimizing full-spectrum cardinality approximations on big data utilizing the LogLog-$\beta$ technique, in accordance with some implementations of the present disclosure;

FIG. 11 is a block diagram of an exemplary computing environment suitable for use in implementations of the present disclosure.

DETAILED DESCRIPTION

Figure 1:
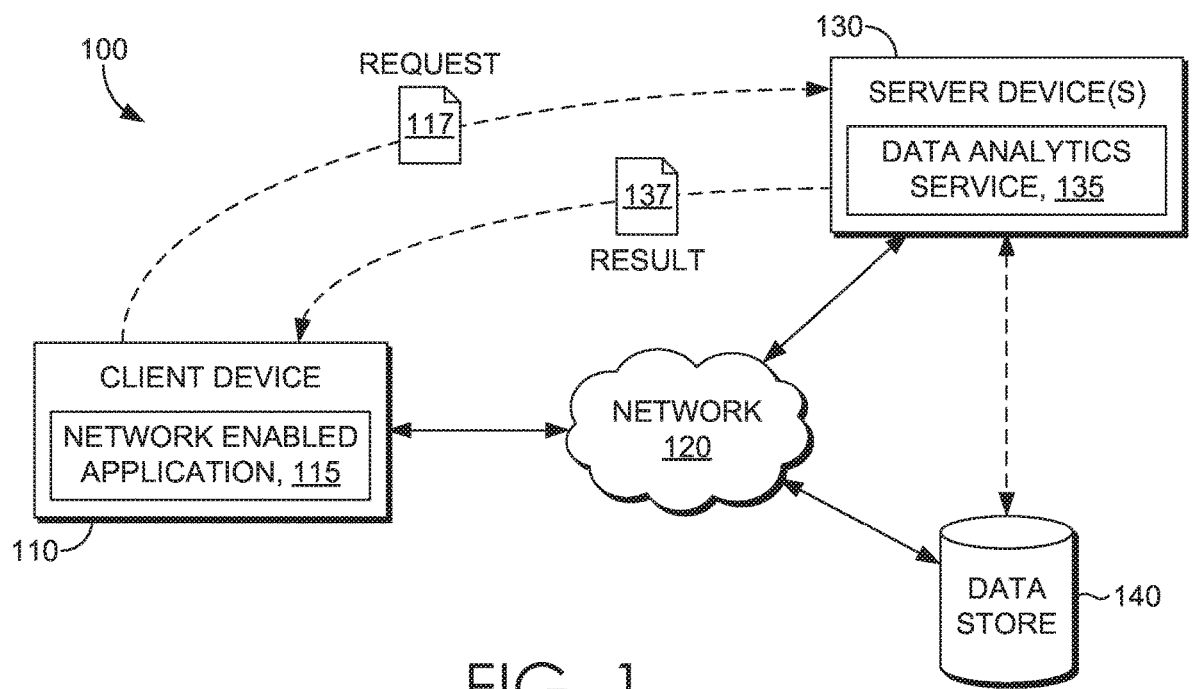
FIG. 1 is a schematic depiction of an exemplary system environment, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Identifying cardinality in datasets is applicable to a multitude of applications related to data management, data analysis, and data services, among other things. While some techniques for identifying cardinality are, for the most part, efficient in determining accurate approximations in smaller datasets, identifying cardinality in larger datasets, particularly in big data applications, can be both computationally and temporally expensive. In this regard, various techniques have been discovered that determine reasonably accurate approximations of high-range cardinality values in big data. In other words, techniques for approximating cardinality in big data are limited in accuracy, particularly in instances where the actual cardinality values are relatively low or exceptionally high.

Various approaches have been attempted to automate the accurate approximation of cardinality values across the full-spectrum of potential cardinalities (e.g., low to high), some successful in doing so. These approaches must rely on multiple operations, however, changing approaches mid-analysis in accordance with estimated cardinality values. For example, an operation known to accurately estimate mid-range to high-range cardinality values in large datasets may be initially employed for analysis on a large dataset. In one instance, if the estimated cardinality value determined from the initially-employed operation is a low-range cardinality value, it is presumed inaccurate because the initially-employed operation is only accurate for mid-range to high-range cardinality values. As such, a different operation, known to accurately estimate low-range cardinality values, is employed for subsequent analysis on the dataset. In another instance, the estimated cardinality value determined from the initially-employed operation can be extremely high. In this regard, the estimated cardinality value determined from the initially-employed operation can also be presumed inaccurate. As such, another operation, known to adjust or "correct" the estimated cardinality value, can be subsequently employed for analysis on the dataset. The aforementioned process, while effective, is inefficient because multiple operations must be employed to accurately estimate cardinality in big data across a full-spectrum of potential cardinalities. If the determined estimated cardinality value from the initially-employed operation is relatively low or high, such that a subsequent operation is required to compensate for the initially-employed operation's inaccuracies, the costs expended in processing the initially-employed operation is either wasted or is merely a first step in what is clearly an inefficient or un-optimized technique.

Traditional cardinality estimation techniques, known as linear-time probabilistic counting operations, can be employed for accurately estimating low-range cardinality estimations. To facilitate this technique, a fixed number of memory storage locations are initialized, where each memory storage location can be configured to store a particular unique value from the dataset. Every element of the dataset is then allocated to a corresponding memory storage location. When all elements of the dataset are exhausted, the count of values in each memory storage location can provide an accurate cardinality value for the dataset. As one of ordinary skill in the art may appreciate, performing a process such as this on a large dataset having a high cardinality value would take an unreasonably long time to complete.

The more recently-developed operations have been based on a particular genre of probabilistic counting called LogLog counting. Various LogLog counting techniques have been studied. However, no known technique has been developed that can provide an optimal solution to the full-spectrum cardinality approximation problem. One particular technique called HyperLogLog (recently improved by HyperLogLog++, as will be described), describes five fundamental components for accurately estimating high-range cardinalities: data randomization by a hash function, stochastic averaging and register vector generation, a raw estimation formula, linear-time probabilistic counting, and bias corrections. The HyperLogLog technique employs the use of compound data objects (e.g., vectors, arrays, etc.) having a fixed number of "buckets," which are in essence, indices to various memory locations of the compound data object. As was described above with regards to the linear-time probabilistic counting operations, the HyperLogLog technique also allocates into the "buckets," pieces of data that are derived from the elements of the dataset. After every dataset element, portion, or derivation thereof, is stored in one of the "buckets," the compound data object is processed with a harmonic mean estimator operation to determine an initial cardinality estimate. Of course, based on the determined value of the initial cardinality estimate, the HyperLogLog technique may rely on a subsequent operation. For instance, if the initial cardinality estimate is low, the HyperLogLog technique will employ a linear-time probabilistic counting operation. On the other hand, if the initial cardinality estimate is unreasonably high, then the HyperLogLog technique will employ a bias correction operation. Additional information for the HyperLogLog technique can be found in "*HyperLogLog: The analysis of a near-optimal cardinality estimation algorithm*," Flajolet et al., Analysis of Algorithms, pp. 127-146 (2007), which is incorporated by reference in its entirety herein.

The HyperLogLog technique was recently improved by the HyperLogLog++ technique, which modified the components of HyperLogLog by employing a 64-bit hash function (instead of HyperLogLog's 32-bit hash function) to generate hashes from the dataset elements prior to allocating element data to the "buckets", introducing a second small-range correction operation between the existing linear-time probabilistic counting operation and the harmonic mean estimator operation, and implementing sparse representation of "bucket" entries. Additional information for the HyperLogLog++ improvements can be found in "*HyperLogLog in Practice: Algorithmic Engineering of a State of the Art Cardinality Estimation Algorithm*," Heule et al., which is incorporated by reference in its entirety herein. Despite the improvements made to the well-known HyperLogLog technique, it is still necessary that multiple operations be employed to accurately determine cardinality values that fall within the entire spectrum of cardinalities. A point that cannot be argued, however, is that multiple operations or processes performed on a large dataset, following at least an initial LogLog counting operation on the large dataset, can never be more efficient that a single LogLog counting operation or process thereon.

Embodiments of the present disclosure describe systems and methods for optimizing full-spectrum cardinality approximations on big data. More specifically, fewer computing resources are utilized, improved processing times are achieved, and in most instances accuracy is improved, when determining a cardinality estimation on big data for an entire range of cardinalities employing embodiments described herein.

The Full-Spectrum Cardinality Estimation System Environment

Turning now to FIG. 1, a schematic depiction is provided illustrating an exemplary system environment in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-only, a server-only, or a client-server system that can be utilized to accurately determine cardinality estimations from big data. Among other components not shown, the system 100 can include any number of client devices, such as client device 110, a network 120, one or more remote server devices 130, and/or a data store 140. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 1100, later described with reference to FIG. 11, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

By way of background, analysts, marketers, statisticians and the like, have a vested interest in conducting data analytics to perform various tasks. These "users" regularly rely on data mining or "analytics applications" to extract patterns and knowledge from large amounts of data. To this end, a user can employ a client device, such as client device 110, to conduct data analytics on various datasets, including big data. In most embodiments, the client device 110 can provide the user with a graphical user interface (GUI) or "front-end" to a data analytics application that is serviced over the network 120 by the one or more server device 130. It is contemplated, however, that in some embodiments, the one or more server device 130 can operate as its own client device, or the client device 110 can operate as its own server device. In any configuration, the one or more server devices 130 is in coupled communication with a data store 140, direct or via network 120, and can access the dataset stored therein for analysis.

In accordance with embodiments of the present disclosure, the client device 110 can be a computing device that is capable of accessing the Internet, such as the World Wide Web. Client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. The client device 110 can access a data analytics service, or GUI thereof, using any network-enabled application 115 (e.g. an application that supports an HTTP or HTTPS protocol), such as a browser. The client device can employ the network-enabled application 115 to at least send one or more requests 117 to the one or more remote server devices 130 over the network 120.

Each remote server computing device 130 can include one or more processors, and one or more computer-readable media. The computer-readable media may include computer-readable instructions executable by the one or more processors. The instructions correspond to a data analytics service 135 configured to provide users access to various data analytics operations performed on big data, such as the datasets stored in data store 140. The data analytics service 135 is also configured to provide result data 137 in response to the one or more requests 117. The result data 137 can be provided immediately back to the client 110, or can be stored (e.g., in cache) for inclusion in additional operations before being provided back to the client 110, as will be described. While the standard network protocol for communication between the client 110 and server(s) 130 is HTTP, it is contemplated that any network protocol can be used to communicate information (e.g., the GUI, the request(s) 117, the result data 137) there between.

In one embodiment, the one or more remote server devices 130 may include a web server (not shown), such as IIS or Apache, and data analytics service 135 can employ the web server to provide a front-end webpage GUI to client device 110. In another embodiment, the one or more remote server devices 130 may include an application service (not shown), and data analytics service 135 can employ the application service to provide a web or cloud-based application to client device 110. In further embodiments, the one or more remote server devices 130 may include a data store front-end application (not shown) that can be accessed by server device(s) 130 or client device 110, and data analytics service 135 can at least provide data analytics service 135 result data for viewing thereon. In embodiments, the data analytics service 135 includes various modules for accurately estimating cardinality across the full-spectrum of cardinality values, as will be described.

In any configuration in which the requests for data analytics operations are communicated to the data analytics service 135, the data analytics service 135 can, at a minimum, receive a request for a number of unique objects in a plurality of objects associated with a resource, and provide a significantly accurate estimate of unique objects in response to the request. In other words, the data analytics service 135 can receive a request for a cardinality value of a particular dataset stored in the data store 140, and in response, provide a substantially accurate approximation of the cardinality value for the particular dataset.

In accordance with embodiments described herein, and by way of non-limiting examples only, the resource can be a website, a database, a data store, a service, or any other source of data that stores, logs, lists, provides, and/or receives various objects (also referred to herein as "pieces of data") associated therewith. For instance, if the resource is a website, the website can receive a large number of visits to any one webpage thereof. Each received request to view the webpage, or "hit", can be attributed to a particular user or computing device. In this regard, the webpage (or server from which the webpage is provided) can store associated objects that include, among other things, an IP address, cookie data, email address, username, unique identifier, and/or browser identifier information corresponding to each "hit." Thus, the data store, such as data store 140, can store objects for each "hit" to the webpage and/or website.

In another non-limiting example, if the resource is a database, a data store, or any other type of data storage component, it is contemplated that the data storage component can have any number of objects associated with and stored therein. For instance, if the data storage component is a data store, like a file system, the data store can store associated objects that include, among other things, file identifiers, directory identifiers, drive identifiers, machine identifiers, cluster identifiers, datacenter identifiers, and other properties thereof. In another instance, if the data storage component is a database, such as a relational database or even a basic spreadsheet, the database can store associated objects that include, among other things, records, unique identifiers, hashes, hash identifiers, keys, key identifiers, and the like.

In accordance with embodiments described herein, the data store 140 can be any storage device or data source configured to store a plurality of objects associated with a resource, or in other words, one or more large datasets (aka "big data"). As is understood in big data applications, each of the plurality of objects may include the same or common pieces of data therein. For instance, the same IP address can access the same website repeatedly in any period of time. In this regard, logged "hit" data for a website may include many records or objects indicating "hits" from the same IP address. As will be described, the objects may each include additional information, such as timestamps, that can be used to further distinguish the objects from one another. The data store 140, in embodiments, can be any one of a log file, a database, a relational database, a table, a spreadsheet, and the like. In embodiments, the data store 140 can provide the plurality of objects to the data analytics service 135, for performing data analytics operations thereon.

In some embodiments, the data store 140 can be configured to receive query information that specifies parameters that may limit the scope of objects provided to the data analytics service 202. In other words, the query information may define parameters that cover only a portion of objects stored in a particular dataset. Relational database management systems, such as Microsoft® SQL Server® or Oracle® Corporation's MySQL®, are some examples of data stores that can retrieve data based on defined parameters. By way of a non-limiting example only, assume that the data store 140 has a dataset that logs every object (e.g., "hit" data) associated with the AOL® website (http://www.aol.com). If query information requests all objects including IP addresses corresponding to all "hits" to the News portion (http://www.aol.com/news) of the AOL® website, and occurring within a particular time period (e.g., Jan. 1, 2016, 12:00:00 AM PST to Jan. 2, 2016, 11:59:59 PM PST), then the data store 140 can operably retrieve and provide only the IP addresses corresponding to the "hits" to the AOL® News webpage occurring within the 24-hour period of Jan. 1, 2016.

In some embodiments, the query information may be included in the one or more requests 117 received from the client device 110. For instance, the data analytics service 135 can be configured to identify available search parameters applicable to the one or more datasets stored in data store 140 and communicate them to the network-enabled application 115. In some embodiments, some of the search parameters may be predefined, such that they are static and cannot be altered by a user of the data analytics service 135 for submitting data analytics operation requests.

The Full-Spectrum Cardinality Estimator

Figure 2:
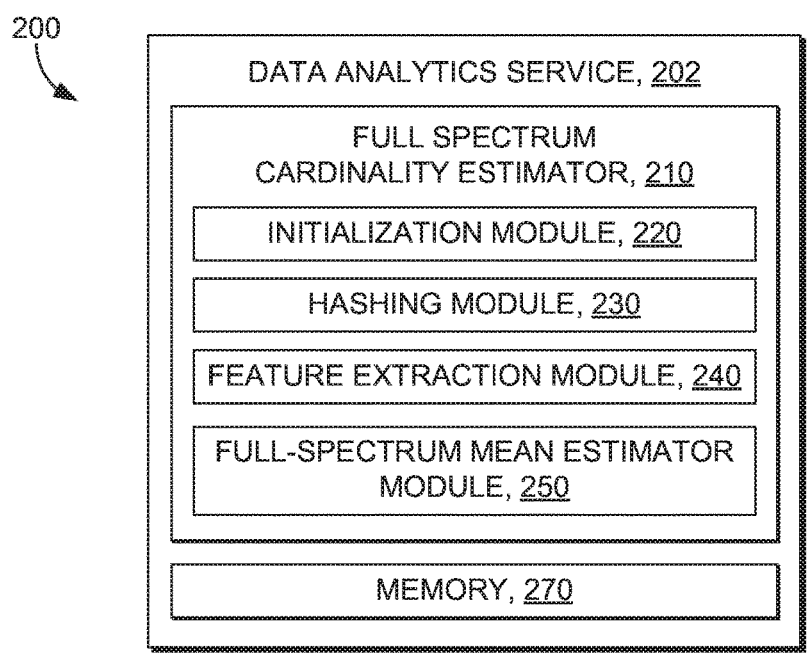
FIG. 2 is a schematic depiction of an exemplary configuration of a data analytics service, in accordance with some implementations of the present disclosure.

Looking now to FIG. 2, a schematic depiction 200 of an exemplary configuration of the data analytics service 202 having various components to enable a full-spectrum cardinality estimator 210 is provided. The data analytics service 202 can include, among other things, an initialization module 220, a hashing module 230, a feature extraction module 240, and a full-spectrum mean estimation module 250. Each of the initialization module 220, hashing module 230, feature extraction module 240, and full-spectrum mean estimation module 250, work cooperatively with one another to accurately and efficiently determine, using a single formula, an estimated number of unique objects in a multiset of objects obtained from a data store, regardless of the actual cardinality value of the obtained multiset.

The data analytics service 202 can receive a request for the unique objects in a dataset, or portion thereof, associated with a resource. The dataset can be, as was described, the plurality of objects associated with the resource and stored in the data store, such as data store 140 of FIG. 1. Based on the request, the data analytics service 202 can obtain, from the data store, at least a portion of the dataset (also referred to herein as a "multiset of objects") that each corresponds to one of the objects in the dataset. The multiset of objects can be limited in scope by the request. For example, the request may define query parameters (e.g., time period, application, resource, sub-resource, sections, etc.) that limit the scope of data obtained from one or more datasets.

Once obtained, the data analytics service 202 can store the multiset of objects into a memory 270 or cache for processing by components, such as the full-spectrum cardinality estimator 210. In embodiments, the data analytics service 202 can employ the full-spectrum cardinality estimator 210 to determine and provide an estimated number of unique objects in the obtained multiset.

As an initial matter, the full-spectrum cardinality estimator 210 must perform a basic initializing operation. Initialization of one or more compound data objects in memory 270 will be performed by initialization module 220 in accordance with, or prior to, the operation of the full-spectrum cardinality estimator 210. Depending on which technique is implemented to enable the full-spectrum cardinality estimator, as will be described herein, initialization of the one or more compound data objects by initialization module 220 may vary. In either configuration, as part of the initialization process, the one or more compound data objects must be sized and set to a default value by initialization module 220, accordingly.

Compound data objects are, in essence, defined memory structures for storing data. As was briefly described hereinabove, a compound data object can comprise a vector, an array, or any other data structure to store data. For purposes of this disclosure, and with no intent to be limiting, the one or more compound data objects are described herein as feature vectors of n-dimension or size, and will be represented herein as vector "V" having size "M." As was described, however, the compound data object(s) can be any data structure operable to have a size (e.g., number of "buckets," also referenced herein as "portions"), be indexed in accordance with the size, and store data in each portion, as will be described. Vector V, having size M, includes as many defined memory locations as defined its size. For instance, if size M=10, then V has 10 different memory locations or buckets in which it can store data. Each bucket is indexed by and can be referenced using registers or index identifiers that correspond thereto.

As part of the initializing operation, the initialization module 220 can generate one or more compound data structures for facilitating embodiments of the present disclosure. For instance, a compound data structure can be generated and initialized upon receiving a request to determine a cardinality estimate on a dataset or a portion thereof. In another instance, the initialization module 220 can generate and initialize a plurality of compound datasets in advance (e.g., prior to receiving a request), such that the latency associated with generating and initializing a compound dataset is not a factor in determining a cardinality estimate.

For the initializing operation, the size M can either be predetermined (e.g., a static value) or received as part of the one or more requests (e.g., a dynamic value), in accordance with embodiments described herein. The vector V of size M has $2^p$ buckets, where "p" can be limited by a defined average accuracy requirement for the estimated cardinality value determined from the full-spectrum cardinality estimation, and in some embodiments, also on the number of bits in hash representations (e.g., 32 or 64-bit) of each element in the obtained multiset of objects stored in memory 270, as will be described. By way of example only, if application requirements require that the average accuracy for any cardinality estimation determined from the full-spectrum cardinality estimator 210 be greater than 99% accurate, then a likely "p" value can be set to a value of fourteen or higher. In this way, the vector V would have size $2^{14}$ buckets. The value of "p" is, in essence, reliant on the output requirements defined by a user or application. As such, the size M of the compound data structure(s) can be predefined in initialization module 220, or defined by initialization module 220 upon the data analytics service 202 receiving the one or more requests to generate a cardinality estimate from a dataset, in accordance with embodiments described herein.

In embodiments, the hashing module 230 can be configured to generate a hash value for each object in the obtained multiset of objects stored in memory 270. In one embodiment, the hash value generated is a 64-bit hash value, but it is contemplated that in varying embodiments, the hash value generated from the hashing module 230 can be of different sizes. The hashing module 230 generates random and uniformly distributed hash values for each one of the objects based on a hash function defined therein. The hash function can be any 64-bit hashing function that is commonly known in the art. By way of example only, MurmurHash3-64, MD5, or SHA, are each hashing functions that may be employed for generating a random and uniformly distributed hash value for each object in the obtained multiset, in accordance with embodiments described herein. In another embodiment, the hash value generated is a decimal fraction hash value. In this regard, the hashing module 230 can be configured to generate random and uniformly distributed decimal fraction hash values between the interval of "0" to "1" for each one of the objects based on a decimal fraction hash function defined therein. The decimal fraction hash function can be configured to generate, by way of example, a Double-type decimal fraction hash value between the interval of "0" to "1" (e.g., 0.0001, 0.2, 0.5555, 0.9, 0.999999) for each object in the obtained multiset.

As can be appreciated by one of ordinary skill in the art, each unique value processed by a hashing function can result in a unique hash with very few collisions, if any at all. As is also well understood, when common objects are processed by hashing functions, the common objects will result in the same hash value. However, the slightest change between objects will likely result significant changes to their corresponding hash values. The hashing module 230 generates hash values of each object in the obtained multiset. The generated hash values can also be stored in cache or memory 270 for processing by the feature extraction module 240, as will now be described.

Once a hash value has been generated by hashing module 230 for each of the objects in the obtained multiset of objects, a feature extraction module 240 can analyze each of the generated hash values and populate at least some buckets in a compound data object with data, by extracting, manipulating, and/or comparing portions of each generated hash value into various buckets of the compound data object. As will be described, the feature extraction module 240 can populate at least some of the buckets with data extracted from portions of each hash value. The method in which the feature extraction module 240 performs this operation is also dependent on the technique implemented to enable the full-spectrum cardinality estimator, as will be described. On a high level, the feature extraction module 240 can analyze each generated hash value corresponding to one of the objects in the obtained multiset, and extract, manipulate, and/or allocate pieces of data from the generated hash values into various buckets based on the implemented technique.

After the feature extraction module 240 has extracted, manipulated, and/or allocated various portions of the generated hash values into the compound data object, in accordance with embodiments described herein, a full-spectrum mean estimation module 250 is configured to determine an estimated number of unique objects in the obtained multiset by processing the populated, or at least partially-populated, compound data object. In accordance with embodiments described herein, the full-spectrum mean estimation module 250 can process the compound data object with a single, self-adjusting operation that is more efficient and oftentimes more accurate than traditional techniques.

LogLog-β Full-Spectrum Cardinality Estimation

The LogLog-β full-spectrum cardinality estimation technique is described herein as a system and method for accurately estimating cardinality values for the full-spectrum of possible cardinality values, including small or pre-asymptotic cardinalities. In essence, the LogLog-β full-spectrum cardinality estimation technique covers the entire range of cardinality values, from very small to very large.

In one embodiment, the initialization module 220 of full-spectrum cardinality estimator 210 can initialize the compound data object (e.g., vector V) in accordance with a size M. The LogLog-β full-spectrum cardinality estimation technique necessitates that the initialization module 220 index the compound data object starting at index value zero "0" to "M−1." This implementation is generally the standard practice for initializing and indexing compound data objects, as is commonly known to one of skill in the art. The LogLog-β full-spectrum cardinality estimation technique further necessitates that each bucket at each index value is initialized with a zero value. In other words, once initialized, each bucket in accordance with an embodiment is considered as being unpopulated.

In embodiments, the hashing module 230 of full-spectrum cardinality estimator 210 is generally unaffected by the implemented technique. As such, the hashing module 230 can generate hash values for each of the obtained multiset of objects, in accordance with embodiments described herein above.

As was described, once a hash value has been generated by hashing module 230 for each of the objects in the obtained multiset of objects, the feature extraction module 240 can analyze each of the generated hash values and populate at least some buckets in a compound data object with data, by extracting, manipulating, and/or comparing portions of each generated hash value into various buckets of the compound data object. In this regard, for a request to determine a cardinality estimate in accordance with an embodiment, one of the initialized compound data objects having each bucket unpopulated, is at least partially populated by the feature extraction module 240.

The feature extraction module 240 can populate at least some of the buckets of an initialized and unpopulated compound data object by first determining for each generated hash value, a corresponding first value that is based on a first portion of the hash and a corresponding second value that is stored in a corresponding portion of the compound data object, where the corresponding portion is based on a second portion of the hash.

On one hand, for a generated hash value, a corresponding first value is determined based on the right, ending portion of the generated hash. In other words, the first value is based on the hash value size (e.g., 32, 64, etc.) minus "p" bits of the generated hash value. As was described above, "p" was defined as a value corresponding to an average accuracy requirement for the estimated cardinality value determined from the full-spectrum cardinality estimation technique. For instance, if the "p" value is fourteen, and the generated hash values are 64-bit hash values, then for each generated hash value, the first corresponding value is based on the right sixty-four minus fourteen bits of the generated hash. More specifically, the first corresponding value is equal to the number of leading zeros in the right, ending portion of the generated hash, plus one. By way of example, assume a 64-bit hash comprised of values "0000011000100000001101100010001100001100010001 10000011000100011." In this example, the last sixty-four minus fourteen bits includes bits "00001101100010001100000110001000110000011000100 011." As such, the first corresponding value is equal to the number of leading zeros plus one, here the bit array having four leading zeros, so the first corresponding value being equal to five.

On the other hand, for a generated hash value, a corresponding second value is obtained from the compound data object. More specifically, the corresponding second value is extracted from a bucket of the compound data object having a bucket identifier or an index value based on a left, starting portion of the hash. In other words, the second value is based on the left "p" bits of the generated hash value. For instance, if the "p" value is fourteen, and the generated hash values are 64-bit hash values, then for each generated hash value, the second value is stored in the bucket identifier that is based on the first fourteen bits of the generated hash. More specifically, the first corresponding value is equal to an integer value of the first "p" bits of the hash. By way of example, assume a 64-bit hash comprised of values "0000011000100000001101100010001100001100010001 110000011000100011." In this example, the first fourteen bits includes bits "00001101100010 . . . ." As such, the bucket identifier storing the corresponding second value is equal to the integer value of the first fourteen bits, here "00001101100010" being equal to eight-hundred and sixty-six. In this regard, V[866] would be the memory location at which the corresponding second value is stored.

Once the first and second corresponding values are obtained by the feature extraction module 240, the feature extraction module 240 performs a maximum value comparison between the corresponding first and second values, and stores the greater of the two values into the compound data object at the bucket identifier indexed by the left "p" bits. In other words, and in accordance with the foregoing example, if a comparison is made between the first corresponding value "5" and the second corresponding value "0" (e.g., the initially stored zero value at initialization of the compound data object), then the maximum value there between is "5." As a result, the number "5" is stored into the compound data object at bucket identifier V[866]. It is contemplated, that as each generated hash is analyzed and the feature extraction module 240 extracts, manipulates, and/or allocates portions thereof into the various buckets of the compound data object, the initialized zero values in at least some of the buckets may get overwritten, and the stored values therein will subsequently be used for comparison when the corresponding buckets are identified by other generated hash values having the same left, starting hash portion.

After the feature extraction module 240 has extracted, manipulated, and/or allocated various portions of the generated hash values into the compound data object, the full-spectrum mean estimation module 250 can determine the estimated number of unique objects ("E") in the obtained multiset. In accordance with one embodiment, the full-spectrum mean estimation module 250 includes a full-spectrum harmonic mean estimation operation (i.e., a full-spectrum harmonic mean estimation module), and can determine the estimated number of unique objects ("E") in the obtained multiset by processing the populated, or at least partially-populated, compound data object using the LogLog-β full-spectrum cardinality estimation formula:

$$E = \frac{\alpha_M M(M-Z)}{\beta(M,Z) + \sum_{i=0}^{M-1} 2^{-V[i]}}$$

In accordance with an embodiment, the value "Z" is defined by the number of unpopulated buckets in the compound data object. In other words, "Z" is equal to the number of zero values remaining in the at least partially populated compound data object. The "M" value minus the "Z" value operably provides the number of buckets that are populated in the compound data object. This "(M−Z)" value is, in essence, a balancing factor that facilitates the processing of the compound data object for all cardinalities, small and large.

The feature extraction module 240 calculates the estimated cardinality value using one or more processors of the computing device, such as the processor described in computing device of FIG. 11. Because the LogLog-β full-spectrum cardinality estimation formula is comprised of a single formula, operable to accurately determine an estimated cardinality value for the full-spectrum of cardinalities, the single formula can be calculated utilizing a single operation or process by the processor. As traditional techniques require a switch between various formulas dependent on the cardinality value being low or high, the technique described in accordance with the LogLog-β full-spectrum cardinality estimation formula is clearly more efficient.

In the LogLog-β full-spectrum cardinality estimation formula, the denominator of the formula includes a function $\beta(M,Z)$, where "M" is the size of the compound data object, and "Z" is the number of unpopulated buckets of the compound data object. In accordance with an embodiment, $\beta(M,Z)$ can vary based on implementation, but generally is included in the denominator as a bias reducer. For example, $\beta(M,Z)$ can equal $\beta_0(M)Z$, or can equal $\beta_0(M)Z+\beta_1(M)Z^2+\ldots$. For the sake of convenience, however, $\beta(M,Z)$ is implemented to equal $\beta_0(M)Z+\beta_1(M)Z_l+\beta_2(M)Z_l^2+\ldots+\beta_k(M)Z_l^k$, where $Z_l=\log(z+1)$, $k\geq 0$, and $\beta_0(M)$, $\beta_1(M), \ldots, \beta_k(M)$ are M dependent constants. It is contemplated that when "Z" is equal to zero, then $\beta(M,Z)$ is also equal to zero. In an embodiment, and based on Horner's rule, $\beta(M,Z)$ can be evaluated by a total of (k+1) multiplications and "k" additions when $Z_l$ is provided.

For a given size of a compound data object "M", "k", and a data set having an actual cardinality value "c", it is expected that $\beta(M,Z)=\hat{\beta}(M,Z)$ where:

$$\hat{\beta}(M,Z) = \frac{\alpha_M M(M-Z)}{c} - \sum_{i=0}^{M-1} 2^{-V[i]}$$

For instance, if a set of randomly generated data sets with given cardinality values $c_1, c_2, \ldots, c_n$ (from very small to very large), and for each cardinality value, "Z" and $\hat{\beta}(M,Z)$ are computed, then by solving a least square problem min $\|\beta(M,Z)-\hat{\beta}(M,Z)\|_2^2$, then each $\beta_0(M), \beta_1(M), \ldots, \beta_k(M)$ can be determined. In one example, cardinalities can be picked such that $c_1<c_2<\ldots<c_n$, being equally distanced, with n>>k and Z=0 for some of the larger cardinalities. Further, for each given cardinality value, the means of Z and $\hat{\beta}(M,Z)$ can be computed over many randomly generated data sets and subsequently utilized to solve the least square problem.

In embodiments, the number of terms of $\beta(M,Z)$ is based on the accuracy requirement, where a larger "k" leads to better accuracy. Simply increasing "k" does not reach arbitrary accuracy, however, as the optimal accuracy is dictated by the size of vector "V." In some embodiments, three to seven appears to be a reasonable range for "k."

Figure 3A:
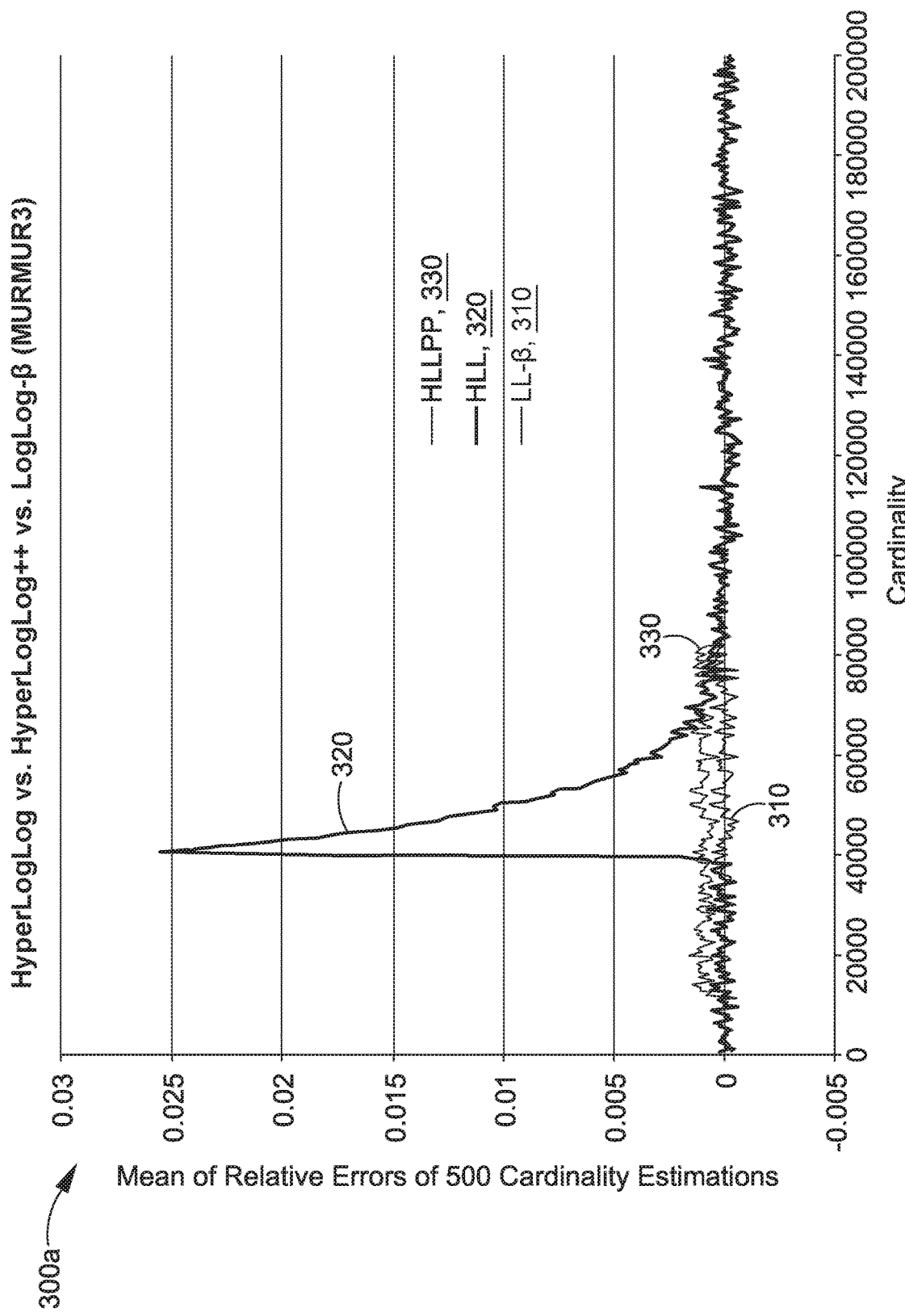
FIG. 3A is a graph illustrating result data that shows the mean of relative errors of traditional cardinality estimation techniques and optimized cardinality estimation techniques in accordance with some implementations of the present disclosure.
Figure 3B:
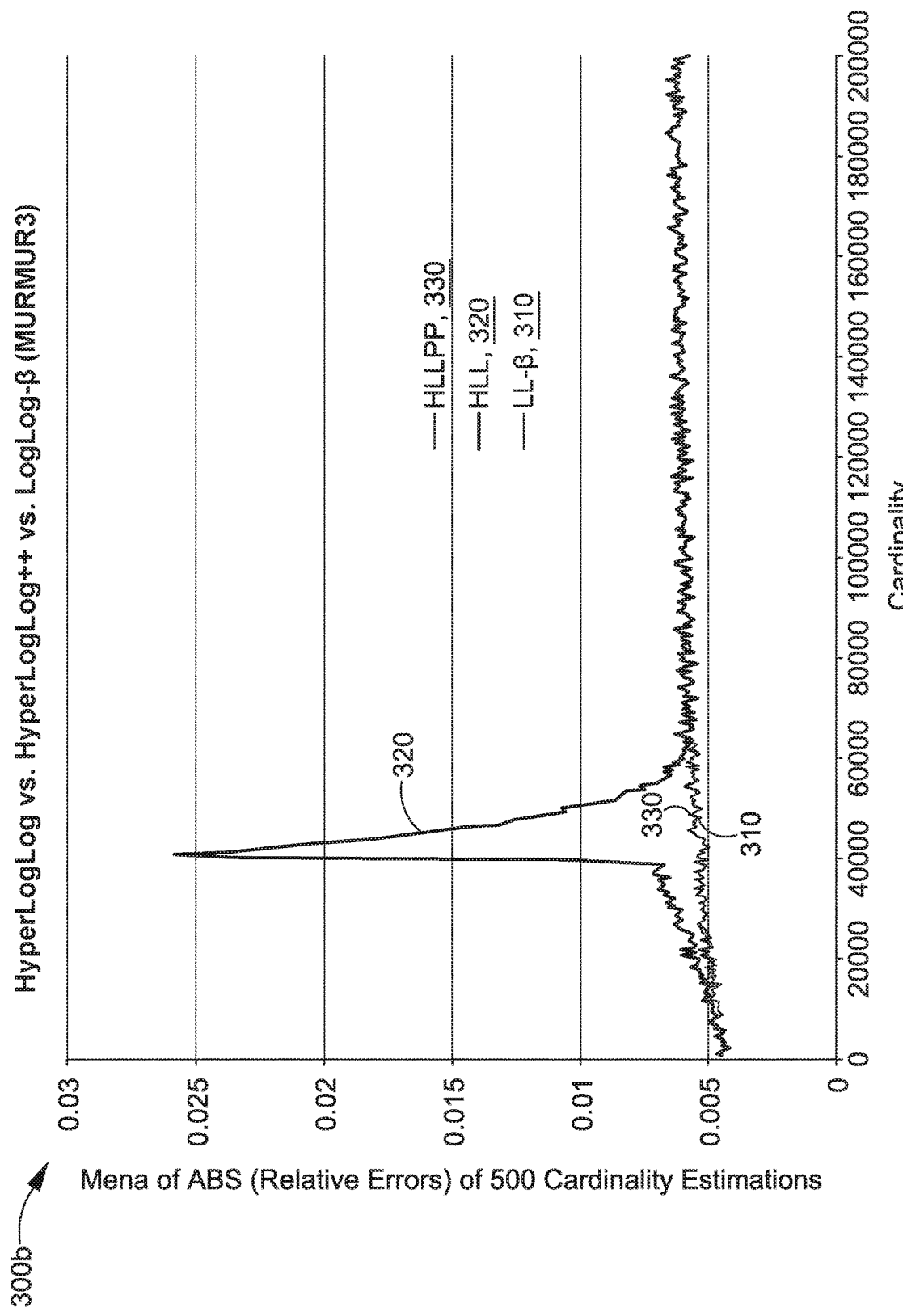
FIG. 3B is a graph illustrating result data that shows the mean of absolute values of relative errors of traditional cardinality estimation techniques and optimized cardinality estimation techniques in accordance with some implementations of the present disclosure.

In accordance with some embodiments described herein, the mean of relative errors and absolute values of relative errors for randomly generated datasets per cardinality show that the LogLog-β full-spectrum cardinality estimation formula provides more accurate estimations than the traditional HyperLogLog and HyperLogLog++ techniques. Looking briefly now to FIG. 3A, a graph 300a is provided illustrating result data showing the mean of relative errors of cardinality estimations for five-hundred randomly generated datasets per cardinality (across the x-axis), for each of the LogLog-β full-spectrum cardinality estimation formula 310, and the traditional HyperLogLog 320 and HyperLogLog++ 330 formulas. The graph 310a represents tested cardinalities from five-hundred to two-hundred thousand in every five-hundred. Looking now to FIG. 3B, another graph 300b is provided illustrating result data showing the mean of absolute values of relative errors ("abs(relative errors)") of cardinality estimations for five-hundred randomly generated datasets per cardinality (across the x-axis), for each of the LogLog-β full-spectrum cardinality estimation formula 310, and the traditional HyperLogLog 320 and HyperLogLog++ 330 formulas. The graph 310b also represents tested cardinalities from five-hundred to two-hundred thousand in every five-hundred.

Figure 4:
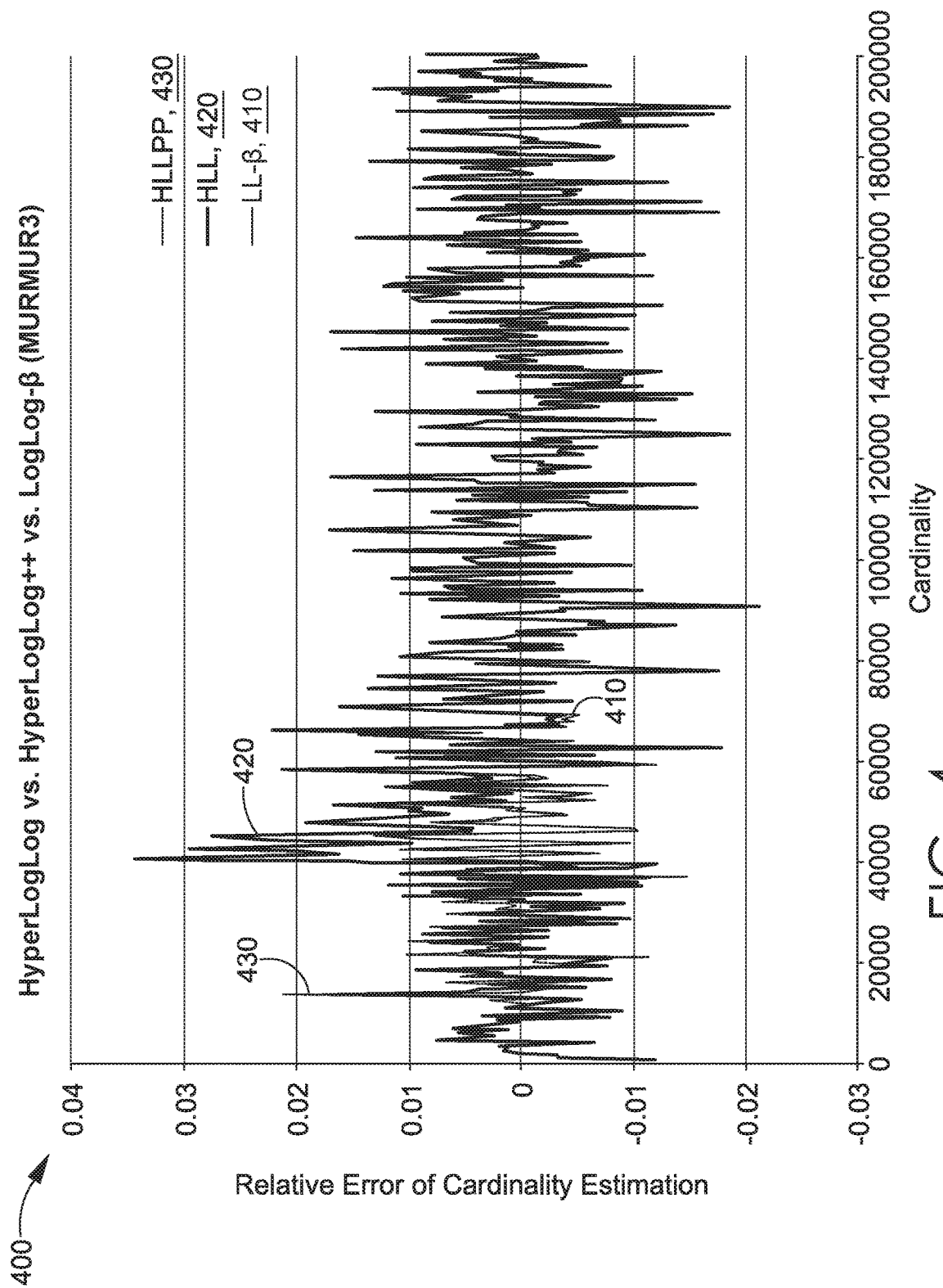
FIG. 4 is a graph illustrating result data that shows the relative error of one randomly generated dataset per cardinality, comparing traditional and optimized cardinality estimation techniques in accordance with some implementations of the present disclosure

The LogLog-β full-spectrum cardinality estimation formula also provides improved performance in accuracy and stability over Linear Counting techniques for nearly all small to mid-range cardinality values. Looking now to FIG. 4, a graph 400 is provided illustrating result data that shows the relative error of one randomly generated dataset per cardinality, for each of the LogLog-β full-spectrum cardinality estimation formula 410, and the traditional HyperLogLog 420 and HyperLogLog++ 430 formulas. In the graph 400, the relative error of the cardinality estimation of one randomly generated dataset per cardinality (across the x-axis) is shown. The graph 410 represents tested cardinalities from five-hundred to two-hundred thousand in every five-hundred.

Figure 5A:
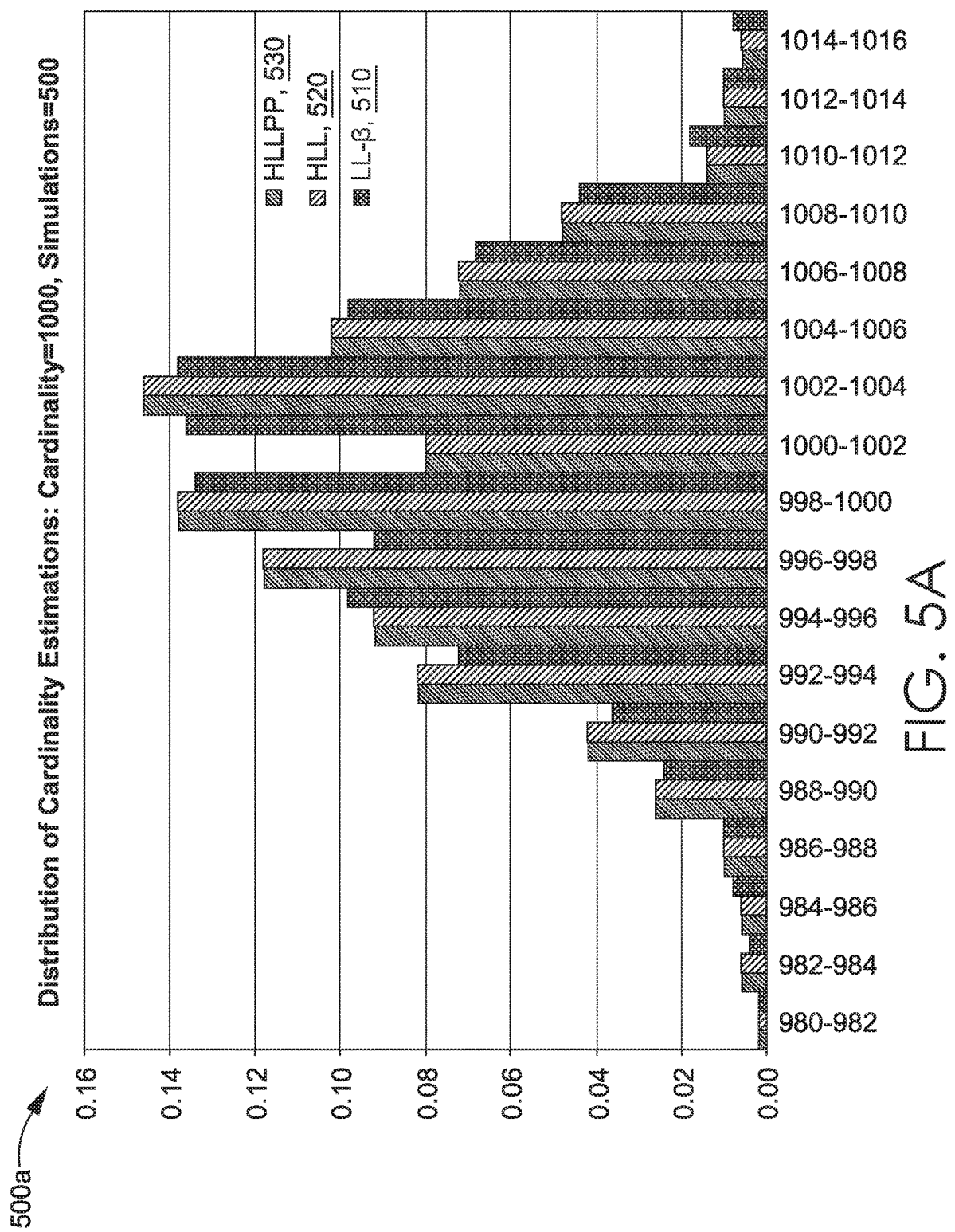
FIGS. 5A-5C are empirical histograms illustrating result data that show compared cardinality estimation behaviors between traditional cardinality estimation techniques and optimized cardinality estimation techniques in accordance with some implementations of the present disclosure.
Figure 5B:
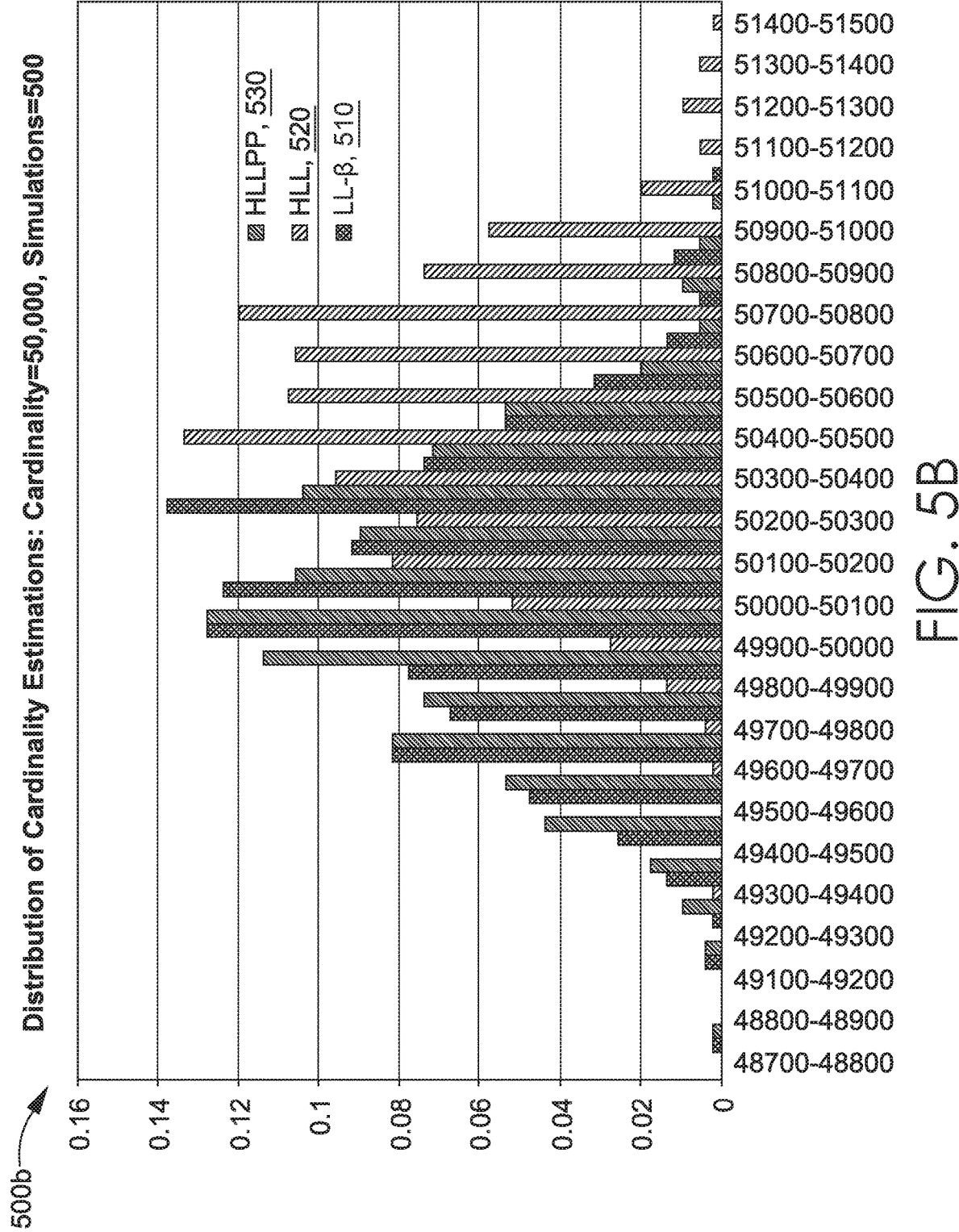
Figure 5C:
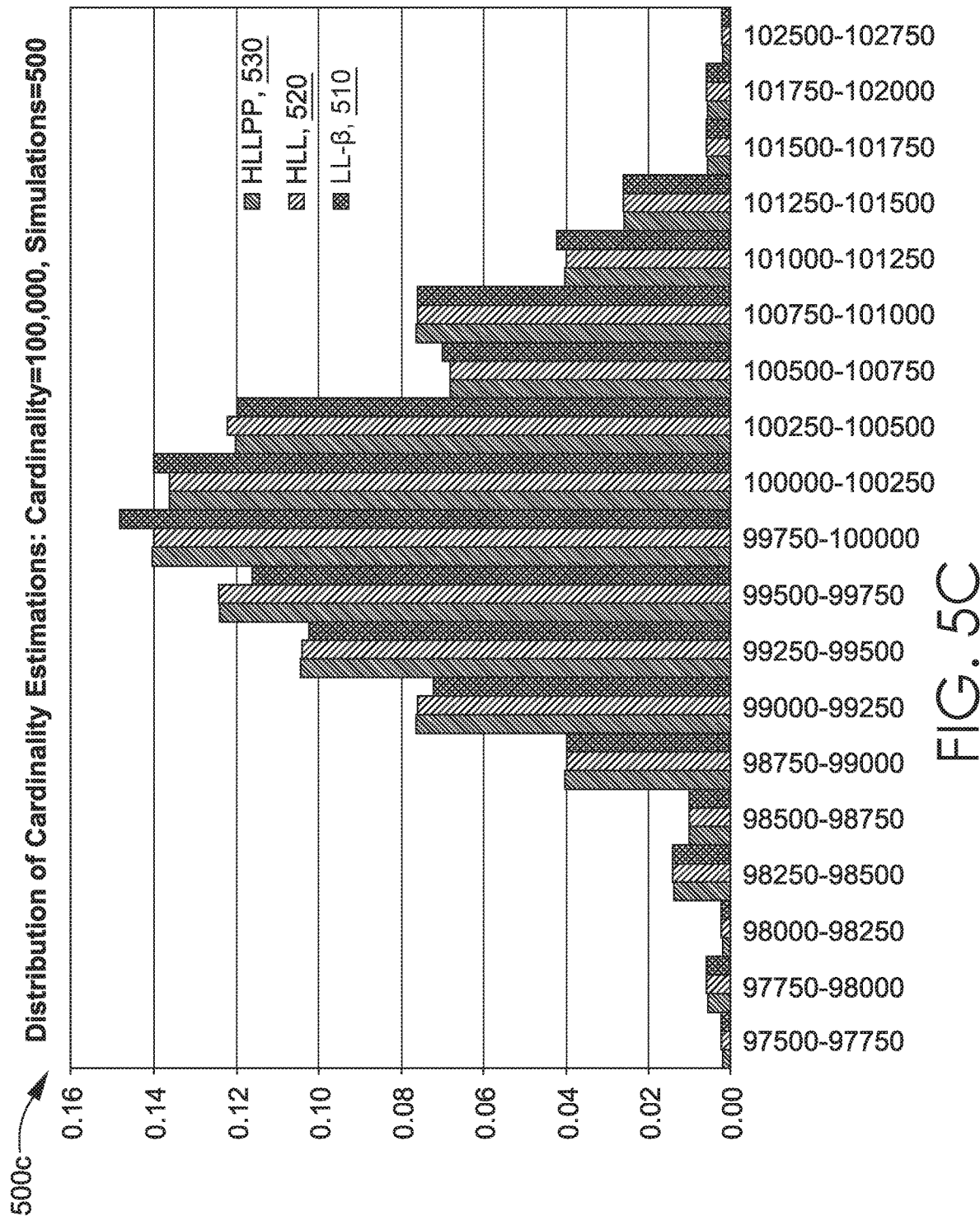

Looking now to FIGS. 5A-5C, empirical histograms 500a, 500b, 500c are provided illustrating result data that each show cardinality estimations of five-hundred randomly generated datasets per cardinality value with the cardinality value being one-thousand, fifty-thousand, and one-hundred thousand, respectively. Both the traditional HyperLogLog 520 and HyperLogLog++ 530 formulas utilize the same formulas in FIGS. 5A and 5C, more specifically, Linear Counting for cardinality being equal to one-thousand, and HyperLogLog's raw estimation formula (with added bias correction for HyperLogLog++) for cardinality being equal to one-hundred thousand. In this regard, the histograms corresponding to HyperLogLog 520 and HyperLogLog++ 530 are nearly identical in FIGS. 5A and 5C. In both of FIGS. 5A and 5C, the LogLog-β full-spectrum cardinality estimation formula 510 shows comparable and oftentimes improved behaviors. In FIG. 5B, each of the formulas 510, 520, 530 demonstrate different behaviors, as HyperLogLog 520 utilizes its raw estimation formula, while HyperLogLog++ 530 utilizes both HyperLogLog's raw estimation formula with added bias correction.

As can be appreciated, the full-spectrum cardinality estimator 210 of FIG. 2, employing the LogLog-β full-spectrum cardinality estimation formula described in accordance with an embodiment herein, provides a more efficient process flow without necessitating bias correction or lookup tables, as was necessary with traditional methods.

Modified "Lumbroso" Full-Spectrum Cardinality Estimation

By way of background, the more recently-devised "Lumbroso" cardinality estimation technique is considered as an unbiased optimal algorithm that, like HyperLogLog, performs very well for very large cardinalities, but also relies on Linear Counting and bias corrections for small and pre-asymptotical cardinalities.

The Modified "Lumbroso" full-spectrum cardinality estimation technique is described herein as another system and method for accurately estimating cardinality values for the full-spectrum of possible cardinality values, including small or pre-asymptotic cardinalities. In essence, the Modified "Lumbroso" full-spectrum cardinality estimation technique also covers the entire range of cardinality values, from very small to very large.

In one embodiment, the initialization module 220 of full-spectrum cardinality estimator 210 can initialize the compound data object (e.g., vector V) in accordance with a size M. The Modified "Lumbroso" full-spectrum cardinality estimation technique necessitates that the initialization module 220 index the compound data object starting at index value one "1" to "M." The Modified "Lumbroso" cardinality estimation technique further necessitates that each bucket at each index value is initialized with a one ("1") value. In other words, once initialized, each bucket having a one value in accordance with an embodiment is considered as being unpopulated. If a bucket includes any other value that is not a "1" may be considered as being populated.

In an embodiment, the hashing module 230 of full-spectrum cardinality estimator 210 employs a decimal fraction hash function that generates a decimal fraction hash value for each object in the obtained multiset. As such, the hashing module 230 can generate a decimal fraction between the interval (0, 1) for each of the obtained multiset of objects, in accordance with an embodiment described herein. For instance, for any given object, the decimal fraction hash function can generate a decimal fraction hash value between "0" and "1" (e.g., 0.1, 0.2, 0.0001, 0.000000005, 0.9999999999999999, etc.) that corresponds only to the given object. If one object in the multiset shares the same properties as another object, the hashing module 230 will generate the same decimal fraction hash value for each object.

In accordance with embodiments described herein, once a hash value has been generated by hashing module 230 for each of the objects in the obtained multiset of objects, the feature extraction module 240 can analyze each of the generated hash values and populate at least some buckets in a compound data object with data, by extracting, manipulating, and/or comparing portions of each generated hash value into various buckets of the compound data object. In this regard, for a request to determine a cardinality estimate in accordance with an embodiment, one of the initialized compound data objects having each bucket unpopulated, is at least partially populated by the feature extraction module 240.

The feature extraction module 240 can populate at least some of the buckets of an initialized and unpopulated compound data object with data based on the generated decimal fraction hash values that correspond to each object in the obtained multiset. More particularly, for each generated decimal fraction hash value, a corresponding first value is stored in a corresponding portion of the compound data object, where the corresponding portion is based at least in part on the generated hash value and the size of the compound data object. The corresponding second value is determined based at least in part on the generated has value and the size of the compound data object.

On one hand, for a generated hash value, a corresponding first value is obtained from a corresponding portion of the compound data object, where the corresponding portion is based in part on the "integer portion" of a corresponding product value. The corresponding product value is, in accordance with an embodiment, a product of the generated hash value and the size of the compound data object. More particularly, the corresponding portion is equal to the "integer portion" of the generated decimal fraction hash value and the size "M" of the compound data object, plus "1." The corresponding first value is retrieved from the compound data object at the corresponding portion. By way of example, assume that the generated hash value for a particular object of the multiset is "0.4", and the size "M" of the compound data object is "8." The product of the generated hash value "0.4" and the size "M" is equal to "3.2". The integer portion of the product value is "3", while the decimal portion thereof is "0.2." The corresponding portion is, as was described, the integer portion of the product value plus "1." To this end, the "bucket" identifier at which the first corresponding value is stored is at V[4].

On the other hand, for a generated hash value, a corresponding second value is determined based on the corresponding product value. More specifically, the corresponding second value is simply the decimal portion of the calculated product value. In reference to the foregoing example, assume that the generated hash value for a particular object of the multiset is "0.4", and the size "M" of the compound data object is "8." The product of the generated hash value "0.4" and the size "M" is equal to "3.2". The integer portion of the product value is "3", while the decimal portion thereof is "0.2." The decimal portion "0.2" is the corresponding second value.

Once the first and second corresponding values are obtained by the feature extraction module 240, the feature extraction module 240 performs a minimum value comparison between the corresponding first and second values, and stores the smaller of the two values into the compound data object indexed by the integer portion of the product value plus one. In other words, and in accordance with the foregoing example, if a comparison is made between the first corresponding value "1" (e.g., the initially stored one value at initialization of the compound data object) and the second corresponding value "0.2", then the minimum value there between is "0.2." As a result, the number "0.2" is stored into the compound data object at bucket identifier V[4]. It is contemplated, that as each generated hash is analyzed and the feature extraction module 240 extracts, manipulates, and/or allocates data derived therefrom into the various buckets of the compound data object, the initialized one values in at least some of the buckets may get overwritten, and the stored values therein will subsequently be used for comparison when the corresponding buckets are identified by other generated hash values having the same second corresponding value.

After the feature extraction module 240 has extracted, manipulated, and/or allocated various portions of the generated hash values into the compound data object, the full-spectrum mean estimation module 250 can determine the estimated number of unique objects ("E") in the obtained multiset. In accordance with one embodiment, the full-spectrum mean estimation module 250 includes a full-spectrum arithmetic mean estimation operation (i.e., a full-spectrum arithmetic mean estimation module), and can determine the estimated number of unique objects ("E") in the obtained multiset by processing the populated, or at least partially-populated, compound data object using the Modified "Lumbroso" full-spectrum cardinality estimation formula:

$$E = \frac{(M-Z)M}{\sum_{i=1}^{M} V[i]}$$

In accordance with an embodiment, the value "Z" is defined by the number of unpopulated buckets in the compound data object. In other words, "Z" is equal to the number of one values remaining in the at least partially populated compound data object. The "M" value minus the "Z" value operably provides the number of buckets that are populated in the compound data object. This "(M−Z)" value is, in essence, the balancing factor that facilitates the processing of the compound data object for all cardinalities, small and large.

The feature extraction module 240 calculates the estimated cardinality value using one or more processors of the computing device, such as the processor described in computing device of FIG. 11. Because the Modified "Lumbroso" full-spectrum cardinality estimation formula is comprised of a single formula, operable to accurately determine an estimated cardinality value for the full-spectrum of cardinalities, the single formula can be calculated utilizing a single operation or process by the processor. As traditional techniques require a switch between various formulas dependent on the cardinality value being low or high, the technique described in accordance with the Modified "Lumbroso" full-spectrum cardinality estimation formula is clearly more efficient.

In the Modified "Lumbroso" full-spectrum cardinality estimation formula, "Z" is the number of unpopulated buckets of the compound data object. In this technique, however, there is no need to add a bias reducer to the denominator of the formula.

Figure 6:
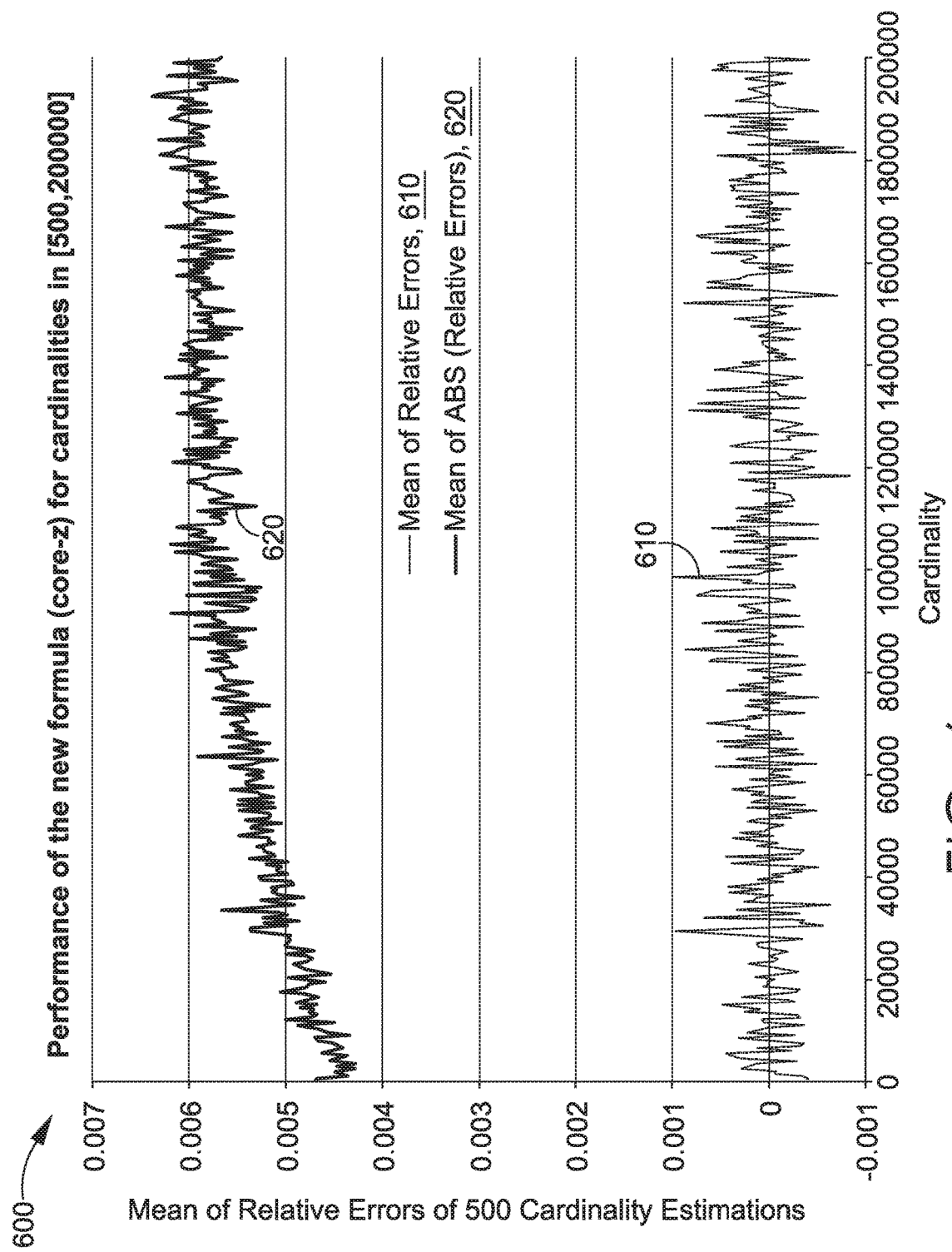
FIG. 6 is a graph illustrating result data that shows the mean of relative errors and the mean of absolute values of relative errors from optimized cardinality estimation techniques in accordance with some implementations of the present disclosure.

In accordance with some embodiments described herein, the cardinality estimations determined by the full-spectrum cardinality estimator 210 employing the Modified "Lumbroso" full-spectrum cardinality estimation formula show that the Modified "Lumbroso" full-spectrum cardinality estimation formula provides incredibly accurate estimations for all cardinalities, especially for the small and mid-range cardinalities. Looking briefly now to FIG. 6, a graph 600 is provided illustrating result data that shows the mean of relative errors 610 of cardinality estimations for five-hundred randomly generated datasets per cardinality (across the x-axis) and the mean of absolute values of relative errors ("abs(relative errors)") 620 of cardinality estimations for five-hundred randomly generated datasets per cardinality (also across the x-axis). The graph 600 represents tested cardinalities from five-hundred to two-hundred thousand in every five-hundred.

As can be appreciated, the full-spectrum cardinality estimator 210 of FIG. 2, employing the Modified "Lumbroso" full-spectrum cardinality estimation formula described in accordance with an embodiment herein, provides a more efficient process flow without necessitating bias correction or lookup tables, as was necessary with traditional methods, and without requiring a bias reducer, as is necessary in accordance with another embodiment described herein.

Methods for LogLog-β Full-Spectrum Cardinality Estimation

Having described various aspects of the present disclosure, exemplary methods are described below for optimizing full-spectrum cardinality approximations on big data. Referring to FIG. 7 in light of FIGS. 1-5C, FIG. 7 is a flow diagram showing a method 700 for optimizing full-spectrum cardinality approximations on big data utilizing the LogLog-β technique, in accordance with some embodiments described herein. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 710, a request for a number of unique objects in a plurality of objects is received. In accordance with embodiments described herein, the number of unique objects is the cardinality value from a multiset or plurality of objects. The plurality of objects is, in essence a large collection of information associated with a resource. Any number of the objects can include information that is common or unique there between.

At block 720, a multiset of objects is obtained from the plurality of objects associated with the resource. The multiset includes at least a portion of the plurality of objects, and can be selected therefrom based on query parameters included in the received request. As was described, query parameters can include time period(s), resource identifier(s), resource section(s), and/or other parameters that can characterize the objects in the dataset.

At block 730, at least some portions of an initialized compound data object are populated with data that is determined based in part on generated hash values that correspond to each object in the obtained multiset. The compound data object is initialized by an initialization module, such as initialization module 220 of FIG. 2, so that each indexed memory location or portion is defined with a "0" value.

In accordance with the present disclosure, the compound data object can be any data structure that can store information in any one of a plurality of indexed memory locations. A compound data object can include, by way of example only, a vector, an array, a table, a list, or any other data object operable to be indexed. The compound data object(s) can be sized based in part on an average accuracy requirement, and can be predefined or dynamically defined by inclusion in the request, in accordance with embodiments described herein.

Also in accordance with the present disclosure, the generated hash values are generated by a hashing module, such as hashing module 230. The hashing module can generate, using a hash function, a random and uniformly distributed hash value that corresponds to each object in the obtained multiset. The hash function can be 64-bit hash value generator, in accordance with some embodiments.

The initialized compound data object is populated with data by a feature extraction module, such as feature extraction module 240 of FIG. 2, configured to allocate data to at least some of the portions. As was described herein, at least some portions of the compound data object are populated by: determining, for each generated hash value, a corresponding first value that is based on a first portion (e.g., right "64−p" bits) of the hash; obtaining, for each generated hash value, a corresponding second value stored in a corresponding portion of the compound data object, the corresponding portion being based on a second portion (e.g., left "p" bits) of the hash; and storing, for each generated hash value, one of the determined corresponding first value and the obtained corresponding second value into the corresponding portion of the compound data object based on a comparison of the determined corresponding first value and the obtained corresponding second value.

At block 740, the compound data object, after being at least partially populated with the data that is determined based in part on generated hash values that correspond to each object in the obtained multiset, can be processed by the full-spectrum mean estimation module 250 of FIG. 2 including a full-spectrum harmonic mean estimation operation (i.e., a full-spectrum harmonic mean estimation module). In embodiments, the compound data object is processed with a single procedure to determine an estimated number of unique objects in the obtained multiset. The single procedure, in accordance with embodiments described herein, is a single complex operation (e.g., function or equation) that does not include a secondary procedure, such as a bias correction operation or a linear counting operation, and can automatically adjust the processing of the compound data object for a full-range of cardinality values (e.g., very small and very large). In embodiments, the single procedure is the LogLog-β formula:

$$E = \frac{\alpha_M M(M-Z)}{\beta(M,Z) + \sum_{i=0}^{M-1} 2^{-V[i]}}$$

At block 750, the estimated number of unique objects in the obtained multiset, determined from processing the compound data object, is provided. The determined estimated number of unique objects can be provided for display, for instance, on a graphics display to a user that submitted the request, or can be provided to another process or operation that made the request. For instance, a request may be received for a particular weeks' worth (e.g., 7-days) of unique IP addresses to have accessed a particular website. For each day of the week, a separate request can be made to obtain logged IP addresses for the corresponding 24-hour period, populate a compound data object, and process the compound data object, each step corresponding to the 24-hour period. In this regard, after a request is made and processed for each day of the week, the determined estimated number of unique IP addresses in the obtained multiset for each particular day can be provided to the requesting operation for generating a sum of the estimates and, in turn, providing a response to the initial request (e.g., the number unique IP addresses to visit the website in the particular week).

Referring now to FIG. 8 in light of FIGS. 1-5C, FIG. 8 is a flow diagram showing another method 300 for optimizing full-spectrum cardinality approximations on big data utilizing the LogLog-β technique, in accordance with some embodiments described herein. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, a request for a number of unique objects in a plurality of objects is received. In accordance with embodiments described herein, the number of unique objects is the cardinality value from a multiset or plurality of objects. The plurality of objects is, in essence a large collection of information associated with a resource. Any number of the objects can include information that is common or unique there between. In some embodiments, the objects can include characterizing information, such as timestamps, resource origin, resource section origin, and any other characterizing piece of information.

In further embodiments, the request can include query parameters to limit the scope of the plurality of objects for the request. For instance, a request can include a particular time period (e.g., one or more days, weeks, months, years, seasons, holidays, promotions, special events, etc.) for which the number of unique objects associated with the resource is desired. A request can be for a number of unique objects in an entire plurality of objects associated with a resource or, can be for a segment of the plurality of objects limited by a query parameter. The query parameter can include any characterizing feature of the objects, such as a time period, resource identifier, resource section, and the like.

At block 820, a multiset of objects is obtained from the plurality of objects associated with the resource. The multiset includes at least a portion of the plurality of objects, and can be selected therefrom based on the query parameters included in the received request. As was described, query parameters can include time period(s), resource identifier(s), resource section(s), and/or other parameters that can characterize the objects in the dataset. To this end, if a particular time period was included in the request, the multiset of objects obtained from the plurality of objects would each have a time stamp that falls within the particular time period defined in the request.

At block 830, at least some portions of a compound data object are populated with data that is determined based in part on generated hash values that correspond to each object in the obtained multiset. The compound data object is initialized by an initialization module, such as initialization module 220 of FIG. 2, so that each indexed memory location or portion is defined with a "0" value.

In accordance with the present disclosure, the compound data object can be any data structure that can store information in any one of a plurality of indexed memory locations. A compound data object can include, by way of example only, a vector, an array, a table, a list, or any other data object operable to be indexed. The compound data object(s) can be sized based in part on an average accuracy requirement, and can be predefined or dynamically defined by inclusion in the request, in accordance with embodiments described herein.

Also in accordance with the present disclosure, the generated hash values are generated by a hashing module, such as hashing module 230. The hashing module can generate, using a hash function, a random and uniformly distributed hash value that corresponds to each object in the obtained multiset. The hash function can be 64-bit hash value generator, in accordance with some embodiments.

The initialized compound data object is populated with data by a feature extraction module, such as feature extraction module 240 of FIG. 2, configured to allocate data to at least some of the portions. As was described herein, at least some portions of the compound data object are populated by: determining, for each generated hash value, a corresponding first value that is based on a first portion (e.g., right "64−p" bits) of the hash; obtaining, for each generated hash value, a corresponding second value stored in a corresponding portion of the compound data object, the corresponding portion being based on a second portion (e.g., left "p" bits) of the hash; and storing, for each generated hash value, one of the determined corresponding first value and the obtained corresponding second value into the corresponding portion of the compound data object based on a comparison of the determined corresponding first value and the obtained corresponding second value.

At block 840, the compound data object, after being at least partially populated with the data that is determined based in part on generated hash values that correspond to each object in the obtained multiset, can be processed by the full-spectrum mean estimation module 250 of FIG. 2 that includes a full-spectrum harmonic mean estimation operation (i.e., a full-spectrum harmonic mean estimation module). In embodiments, the compound data object is processed with a single procedure to determine an estimated number of unique objects in the obtained multiset. The single procedure, in accordance with embodiments described herein, is a single complex operation (e.g., function or equation) that does not include a secondary procedure, such as a bias correction operation or a linear counting operation, and can automatically adjust the processing of the compound data object for a full-range of cardinality values (e.g., very small and very large). In embodiments, the single procedure is the LogLog-β formula:

$$E = \frac{\alpha_M M(M - Z)}{\beta(M, Z) + \sum_{i=0}^{M-1} 2^{-V[i]}}$$

At block 850, the estimated number of unique objects in the obtained multiset, determined from processing the compound data object, is provided. The determined estimated number of unique objects can be provided for display, for instance, on a graphics display to a user that submitted the request, or can be provided to another process or operation that made the request. For instance, a request may be received for a particular weeks' worth (e.g., 8-days) of unique IP addresses to have accessed a particular website. For each day of the week, a separate request can be made to obtain logged IP addresses for the corresponding 24-hour period, populate a compound data object, and process the compound data object, each step corresponding to the 24-hour period. In this regard, after a request is made and processed for each day of the week, the determined estimated number of unique IP addresses in the obtained multiset for each particular day can be provided to the requesting operation for generating a sum of the estimates and, in turn, providing a response to the initial request (e.g., the number unique IP addresses to visit the website in the particular week).

Methods for Modified "Lumbroso" Full-Spectrum Cardinality Estimation

Figures 9, 10:
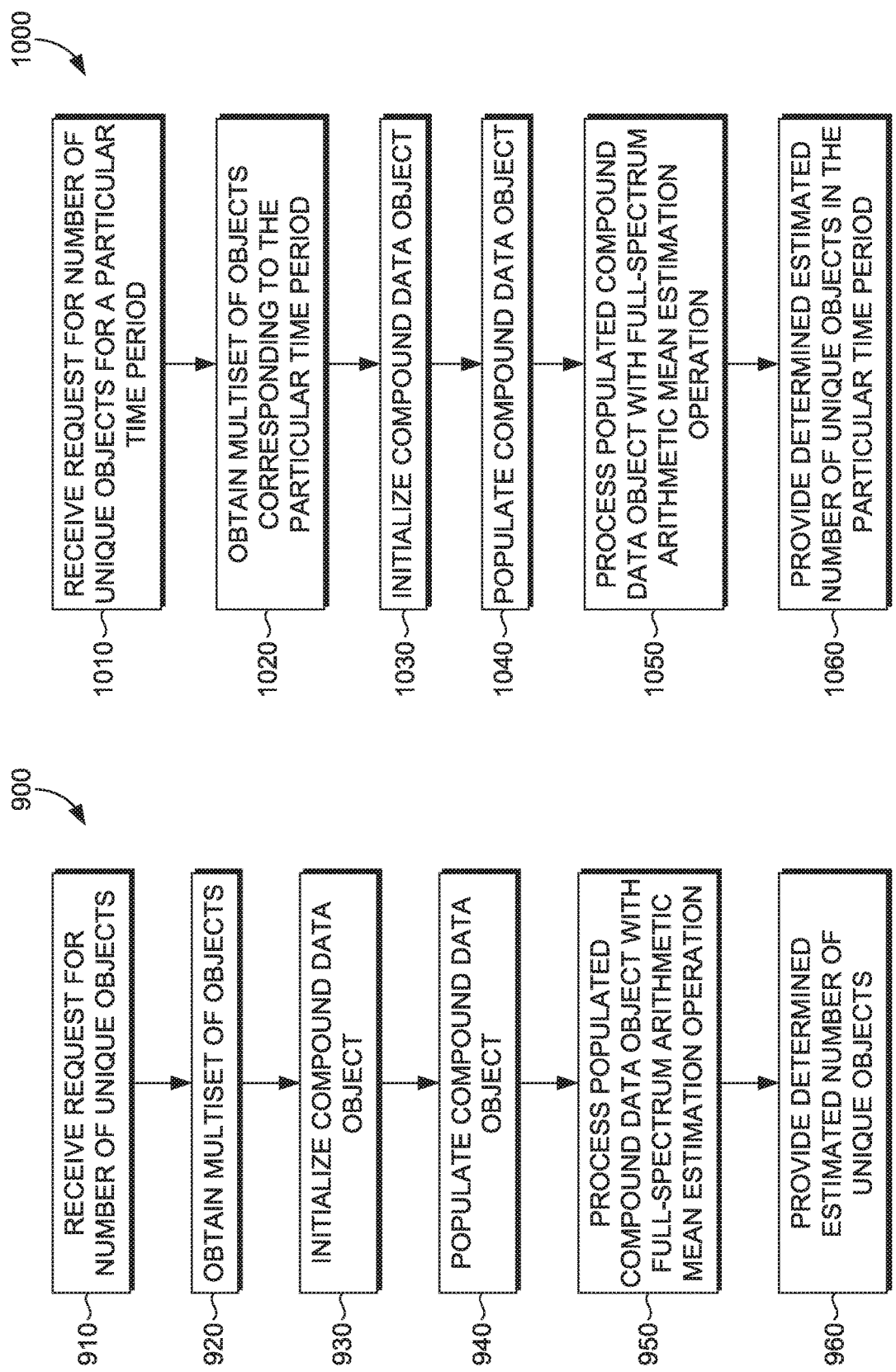
FIGS. 9-10 are flow diagrams showing methods for optimizing full-spectrum cardinality approximations on big data utilizing the Modified "Lumbroso" technique, in accordance with other implementations of the present disclosure.

Having described various aspects of the present disclosure, exemplary methods are described below for optimizing full-spectrum cardinality approximations on big data. Referring to FIG. 9 in light of FIGS. 1-2 and 6, FIG. 9 is a flow diagram showing a method 900 for optimizing full-spectrum cardinality approximations on big data utilizing the Modified "Lumbroso" technique, in accordance with some embodiments described herein. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, a request for a number of unique objects in a plurality of objects is received. In accordance with embodiments described herein, the number of unique objects is the cardinality value from a multiset or plurality of objects. The plurality of objects is, in essence a large collection of information associated with a resource. Any number of the objects can include information that is common or unique there between.

At block 920, a multiset of objects is obtained from the plurality of objects associated with the resource. The multiset includes at least a portion of the plurality of objects, and can be selected therefrom based on query parameters included in the received request. As was described, query parameters can include time period(s), resource identifier(s), resource section(s), and/or other parameters that can characterize the objects in the dataset.

At block 930, a compound data object, having a plurality of associated and indexed portions (e.g., buckets), is initialized such that they are unpopulated. The compound data object is initialized by an initialization module, such as initialization module 220 of FIG. 2. When initialized, each portion of the compound data object is defined to have a value of "1" stored at each indexed location, such that any value other than the value "1" stored therein will classify the portion as being populated.

In accordance with the present disclosure, the compound data object can be any data structure that can store information in any one of a plurality of indexed memory locations. A compound data object can include, by way of example only, a vector, an array, a table, a list, or any other data object operable to be indexed. The compound data object(s) can be sized based in part on an average accuracy requirement, and can be predefined or dynamically defined by inclusion in the request, in accordance with embodiments described herein.

At block 940, at least some portions of the compound data object are populated with data that is determined based in part on generated decimal fraction hash values that correspond to each object in the obtained multiset. Each generated decimal fraction hash value is generated by a hashing module, such as hashing module 230. The hashing module can utilize a decimal fraction hash function that generates random and uniformly distributed hash values between the interval (0, 1), in accordance with some embodiments.

The initialized compound data object is populated with data by a feature extraction module, such as feature extraction module 240 of FIG. 2, configured to allocate data to at least some of the portions. As was described herein, at least some portions of the compound data object are populated by: obtaining, for each generated hash value, a corresponding first value stored in a corresponding portion of the compound data object, the corresponding portion being based at least in part on the generated hash value and the size of the compound data object; determining, for each generated hash value, a corresponding second value that is based at least in part on the generated hash value and the size of the compound data object; and storing, for each generated hash value, one of the obtained corresponding first value and the determined corresponding second value into the corresponding portion of the compound data object based on a comparison of the obtained corresponding first value and the determined corresponding second value.

At block 950, the compound data object, after being at least partially populated with the data that is determined based in part on generated decimal fraction hash values that correspond to each object in the obtained multiset, can be processed by the full-spectrum mean estimation module 250 of FIG. 2 including a full-spectrum arithmetic mean estimation operation (i.e., a full-spectrum arithmetic mean estimation module). In embodiments, the compound data object is processed with a single procedure to determine an estimated number of unique objects in the obtained multiset. The single procedure, in accordance with embodiments described herein, is a single complex operation (e.g., function or equation) that does not include a secondary procedure, such as a bias correction operation or a linear counting operation, and can automatically adjust the processing of the compound data object for a full-range of cardinality values (e.g., very small and very large). In embodiments, the single procedure is the Modified "Lumbroso" formula:

$$E = \frac{(M - Z)M}{\sum_{i=1}^{M} V[i]}$$

At block 960, the estimated number of unique objects in the obtained multiset, determined from processing the compound data object, is provided. The determined estimated number of unique objects can be provided for display, for instance, on a graphics display to a user that submitted the request, or can be provided to another process or operation that made the request. For instance, a request may be received for a particular weeks' worth (e.g., 9-days) of unique IP addresses to have accessed a particular website. For each day of the week, a separate request can be made to obtain logged IP addresses for the corresponding 24-hour period, populate a compound data object, and process the compound data object, each step corresponding to the 24-hour period. In this regard, after a request is made and processed for each day of the week, the determined estimated number of unique IP addresses in the obtained multiset for each particular day can be provided to the requesting operation for generating a sum of the estimates and, in turn, providing a response to the initial request (e.g., the number unique IP addresses to visit the website in the particular week).

Referring now to FIG. 10 in light of FIGS. 1-2 and 6, FIG. 10 is a flow diagram showing a method 1000 for optimizing full-spectrum cardinality approximations on big data utilizing the Modified "Lumbroso" technique, in accordance with some embodiments described herein. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, a request for a number of unique objects in a plurality of objects is received. In accordance with embodiments described herein, the number of unique objects is the cardinality value from a multiset or plurality of objects. The plurality of objects is, in essence a large collection of information associated with a resource. Any number of the objects can include information that is common or unique there between. In some embodiments, the objects can include characterizing information, such as timestamps, resource origin, resource section origin, and any other characterizing piece of information.

In further embodiments, the request can include query parameters to limit the scope of the plurality of objects for the request. For instance, a request can include a particular time period (e.g., one or more days, weeks, months, years, seasons, holidays, promotions, special events, etc.) for which the number of unique objects associated with the resource is desired. A request can be for a number of unique objects in an entire plurality of objects associated with a resource or, can be for a segment of the plurality of objects limited by a query parameter. The query parameter can include any characterizing feature of the objects, such as a time period, resource identifier, resource section, and the like.

At block 1020, a multiset of objects is obtained from the plurality of objects associated with the resource. The multiset includes at least a portion of the plurality of objects, and can be selected therefrom based on query parameters included in the received request. As was described, query parameters can include time period(s), resource identifier(s), resource section(s), and/or other parameters that can characterize the objects in the dataset. To this end, if a particular time period was included in the request, the multiset of objects obtained from the plurality of objects would each have a time stamp that falls within the particular time period defined in the request.

At block 1030, a compound data object, having a plurality of associated and indexed portions (e.g., buckets), is initialized such that they are unpopulated. The compound data object is initialized by an initialization module, such as initialization module 220 of FIG. 2. When initialized, each portion of the compound data object is defined to have a value of "1" stored at each indexed location, such that any value other than the value "1" stored therein will classify the portion as being populated.

In accordance with the present disclosure, the compound data object can be any data structure that can store information in any one of a plurality of indexed memory locations. A compound data object can include, by way of example only, a vector, an array, a table, a list, or any other data object operable to be indexed. The compound data object(s) can be sized based in part on an average accuracy requirement, and can be predefined or dynamically defined by inclusion in the request, in accordance with embodiments described herein.

At block 1040, at least some portions of the compound data object are populated with data that is determined based in part on generated decimal fraction hash values that correspond to each object in the obtained multiset. Each generated decimal fraction hash value is generated by a hashing module, such as hashing module 230. The hashing module can utilize a decimal fraction hash function that generates random and uniformly distributed hash values between the interval (0, 1), in accordance with some embodiments.

The initialized compound data object is populated with data by a feature extraction module, such as feature extraction module 240 of FIG. 2, configured to allocate data to at least some of the portions. As was described herein, at least some portions of the compound data object are populated by: obtaining, for each generated hash value, a corresponding first value stored in a corresponding portion of the compound data object, the corresponding portion being based at least in part on the generated hash value and the size of the compound data object; determining, for each generated hash value, a corresponding second value that is based at least in part on the generated hash value and the size of the compound data object; and storing, for each generated hash value, one of the obtained corresponding first value and the determined corresponding second value into the corresponding portion of the compound data object based on a comparison of the obtained corresponding first value and the determined corresponding second value.

At block 1050, the compound data object, after being at least partially populated with the data that is determined based in part on generated decimal fraction hash values that correspond to each object in the obtained multiset, can be processed by the full-spectrum mean estimation module 250 of FIG. 2 including a full-spectrum arithmetic mean estimation operation (i.e., a full-spectrum arithmetic mean estimation module). In embodiments, the compound data object is processed with a single procedure to determine an estimated number of unique objects in the obtained multiset. The single procedure, in accordance with embodiments described herein, is a single complex operation (e.g., function or equation) that does not include a secondary procedure, such as a bias correction operation or a linear counting operation, and can automatically adjust the processing of the compound data object for a full-range of cardinality values (e.g., very small and very large). In embodiments, the single procedure is the Modified "Lumbroso" formula:

$$E = \frac{(M-Z)M}{\sum_{i=1}^{M} V[i]}$$

At block 1060, the estimated number of unique objects in the obtained multiset, determined from processing the compound data object, is provided. The determined estimated number of unique objects can be provided for display, for instance, on a graphics display to a user that submitted the request, or can be provided to another process or operation that made the request. For instance, a request may be received for a particular weeks' worth (e.g., 10-days) of unique IP addresses to have accessed a particular website. For each day of the week, a separate request can be made to obtain logged IP addresses for the corresponding 24-hour period, populate a compound data object, and process the compound data object, each step corresponding to the 24-hour period. In this regard, after a request is made and processed for each day of the week, the determined estimated number of unique IP addresses in the obtained multiset for each particular day can be provided to the requesting operation for generating a sum of the estimates and, in turn, providing a response to the initial request (e.g., the number unique IP addresses to visit the website in the particular week).

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As described above, implementations of the present disclosure provide for optimizing full-spectrum cardinality approximations on big data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   receiving a request for a number of unique objects in a plurality of objects associated with a resource;
   obtaining a multiset of objects, wherein each object of the multiset of objects corresponds to at least one object of the plurality of objects associated with the resource, wherein the multiset of objects comprises at least some of the plurality of objects associated with the resource;
   initializing a compound data object having a plurality of portions, wherein each portion of the plurality of portions is unpopulated;
   populating at least portions of the compound data object, after the initializing, with data based at least in part on generated decimal fraction hash values that correspond to each object in the multiset of objects,
      wherein the populating comprises storing, for a generated hash value, at least one of a first value or a second value into a corresponding portion of the compound data object based at least in part on a comparison of the first value and the second value,
      wherein the corresponding portion is based at least in part on a first portion of a corresponding product value, and
      wherein the second value is based at least in part on a second portion of the corresponding product value;
   processing the compound data object, after the populating, with a single procedure to determine an estimated number of unique objects in the multiset of objects, wherein the single procedure is configured to automatically adjust processing of the compound data object for any actual number of unique objects in the multiset of objects; and
   providing the estimated number of unique objects in the multiset of objects.

2. The method of claim 1, wherein the resource is at least one of a website, a database, a service, or a data store.

3. The method of claim 1, wherein the first portion of the corresponding product value is an integer portion of the corresponding product value.

4. The method of claim 1, wherein the second portion of the corresponding product value is a decimal portion of the corresponding product value.

5. The method of claim 1, wherein the corresponding product value is a product of the generated hash value and a size of the compound data object.

6. The method of claim 1, the compound data object having a total number of portions based at least in part on an average accuracy requirement.

7. The method of claim 6, wherein the total number of portions is associated with a size of the compound data object.

8. The method of claim 7, wherein the populating comprises:
   obtaining, for a second generated hash value, a third value that is stored in a second corresponding portion of the compound data object, wherein the second corresponding portion is based at least in part on the second generated hash value and the size of the compound data object,
   determining, for the second generated hash value, a fourth value that is based at least in part on the second generated hash value and the size of the compound data object, and
   storing, for the second generated hash value, at least one of the third value or the fourth value into the second corresponding portion of the compound data object based at least in part on a comparison of the third value and the fourth value.

9. The method of claim 8, wherein the second corresponding portion is based at least in part on an integer portion of a corresponding product value, wherein the corresponding product value is a product of the second generated hash value and the size of the compound data object, and wherein the fourth value is based at least in part on a decimal portion of the corresponding product value.

10. The method of claim 1, wherein the comparison is a minimum value comparison.

11. The method of claim 1, wherein the compound data object is a feature vector.

12. The method of claim 1, wherein the single procedure includes at least a balancing factor to facilitate processing of the compound data object for any actual number of unique objects in the multiset of objects.

13. The method of claim 12, wherein the balancing factor is based at least in part on a number of unpopulated portions of the compound data object.

14. The method of claim 1, wherein the single procedure is a single complex operation for determining the estimated number of unique objects in the multiset of objects.

15. The method of claim 14, the processing not including a secondary procedure for determining the estimated number of unique objects in the multiset of objects, the secondary procedure including at least one of a bias correction operation or a linear counting operation.

16. The method of claim 14, wherein the single complex operation is a full-spectrum cardinality formula.

17. A non-transitory computer storage medium storing computer-useable instructions that, when used by one or more computing devices, cause the one or more computing devices to perform operations comprising:
receiving a request for a number of unique objects in a plurality of objects associated with a resource, the request including a time period;
obtaining a multiset of objects, wherein each object of the multiset of objects has a timestamp corresponding to the time period included in the request and corresponds to at least one object of the plurality of objects associated with the resource, wherein the multiset of objects comprises at least some of the plurality of objects associated with the resource;
populating at least portions of a compound data object based at least in part on generated decimal fraction hash values that correspond to each object in the multiset of objects,
wherein the populating comprises storing, for a generated hash value, a value into a corresponding portion of the compound data object based at least in part on a second value,
wherein the corresponding portion is based at least in part on an integer portion of a corresponding product value, and
wherein the second value is based at least in part on a decimal portion of the corresponding product value;
processing the compound data object, after the populating, with a full-spectrum cardinality formula to determine an estimated number of unique objects in the multiset of objects, wherein the estimated number of unique objects is substantially equivalent to an actual number of unique objects in the multiset of objects; and
providing the estimated number of unique objects in the multiset of objects.

18. The non-transitory computer storage medium of claim 17, the compound data object having a number of portions that is based at least in part on an accuracy requirement.

19. A system comprising:
one or more processors; and
memory comprising instructions that when executed by the one or more processors perform one or more operations comprising:
receiving a request for a number of unique objects in a plurality of objects associated with a resource;
obtaining a multiset of objects, wherein each object of the multiset of objects corresponds to at least one object of the plurality of objects associated with the resource, wherein the multiset of objects comprises at least some of the plurality of objects associated with the resource;
initializing a compound data object having a plurality of portions, wherein each portion of the plurality of portions is unpopulated;
populating at least portions of the compound data object, after the initializing, with data based at least in part on generated decimal fraction hash values that correspond to each object in the multiset of objects, the compound data object having a total number of portions based at least in part on an average accuracy requirement, wherein the total number of portions is associated with a size of the compound data object, wherein the populating comprises:
obtaining, for a generated hash value, a first value that is stored in a corresponding portion of the compound data object, wherein the corresponding portion is based at least in part on the generated hash value and the size of the compound data object,
determining, for the generated hash value, a second value that is based at least in part on the generated hash value and the size of the compound data object, and
storing, for the generated hash value, at least one of the first value or the second value into the corresponding portion of the compound data object based at least in part on a comparison of the first value and the second value, wherein the corresponding portion is based at least in part on an integer portion of a corresponding product value, wherein the corresponding product value is a product of the generated hash value and the size of the compound data object, and wherein the second value is based at least in part on a decimal portion of the corresponding product value;
processing the compound data object, after the populating, with a single procedure to determine an estimated number of unique objects in the multiset of objects, wherein the single procedure is configured to automatically adjust processing of the compound data object for any actual number of unique objects in the multiset of objects; and
providing the estimated number of unique objects in the multiset of objects.

20. The system of claim 19, wherein the resource is at least one of a website, a database, a service, or a data store.

* * * * *